(12) United States Patent
Chang et al.

(10) Patent No.: US 8,331,438 B2
(45) Date of Patent: Dec. 11, 2012

(54) ADAPTIVE SELECTION OF PICTURE-LEVEL QUANTIZATION PARAMETERS FOR PREDICTED VIDEO PICTURES

(75) Inventors: Cheng Chang, Redmond, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1351 days.

(21) Appl. No.: 11/810,346

(22) Filed: Jun. 5, 2007

(65) Prior Publication Data

US 2008/0304562 A1 Dec. 11, 2008

(51) Int. Cl.
 *H04N 11/02* (2006.01)
(52) U.S. Cl. .................................. 375/240.03
(58) Field of Classification Search ......................... None
 See application file for complete search history.

(56) References Cited

U.S. PATENT DOCUMENTS

| | | | |
|---|---|---|---|
| 762,026 A | 6/1904 | Connstein |
| 4,583,114 A | 4/1986 | Catros |
| 4,679,079 A | 7/1987 | Catros et al. |
| 4,774,574 A | 9/1988 | Daly et al. |
| 4,821,119 A | 4/1989 | Gharavi |
| 4,862,264 A | 8/1989 | Wells et al. |
| 4,965,830 A | 10/1990 | Barham et al. |
| 4,992,889 A | 2/1991 | Yamagami et al. |
| 5,072,295 A | 12/1991 | Murakami et al. |
| 5,128,758 A | 7/1992 | Azadegan et al. |
| 5,136,377 A | 8/1992 | Johnston et al. |
| 5,144,426 A | 9/1992 | Tanaka et al. |
| 5,146,324 A | 9/1992 | Miller et al. |
| 5,179,442 A | 1/1993 | Azadegan et al. |
| 5,237,410 A | 8/1993 | Inoue |
| 5,241,395 A | 8/1993 | Chen |
| 5,253,058 A | 10/1993 | Gharavi |
| 5,263,088 A | 11/1993 | Hazu et al. |
| 5,301,242 A | 4/1994 | Gonzales et al. |
| 5,303,058 A | 4/1994 | Fukuda et al. |
| 5,317,396 A | 5/1994 | Fujinami |
| 5,317,672 A | 5/1994 | Crossman et al. |
| 5,333,212 A | 7/1994 | Ligtenberg |

(Continued)

FOREIGN PATENT DOCUMENTS

CA 1327074 2/1994

(Continued)

OTHER PUBLICATIONS

Augustine et al., "Region of Interest Editing of MPEG-2 Video Streams in the Compressed Domain," *2004 IEEE Int'l Conf on Multimedia and Expo: ICME '04*, vol. 1, Issue 27-30, pp. 559-562 (Jun. 2004).

(Continued)

*Primary Examiner* — Gilberto Barron, Jr.
*Assistant Examiner* — Shaun Gregory
(74) *Attorney, Agent, or Firm* — Klarquist Sparkman, LLP

(57) ABSTRACT

Techniques and tools for adaptive selection of picture quantization parameters ("QPs") for predicted pictures are described. For example, a video encoder adaptively selects a delta QP for a B-picture based on spatial complexity, temporal complexity, whether differential quantization is active, whether the B-picture is available as a reference picture, or some combination or subset of these or other factors. The delta QP can then be used to adjust the picture QP for the B-picture (e.g., to reduce bit rate for the B-picture without appreciably reducing the perceived quality of a video sequence.

20 Claims, 13 Drawing Sheets

U.S. PATENT DOCUMENTS

| | | |
|---|---|---|
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,473,377 A | 12/1995 | Kim |
| 5,481,553 A | 1/1996 | Suzuki et al. |
| 5,506,916 A | 4/1996 | Nishihara et al. |
| 5,510,785 A | 4/1996 | Segawa et al. |
| 5,537,440 A | 7/1996 | Eyuboglu et al. |
| 5,537,493 A | 7/1996 | Wilkinson |
| 5,539,469 A | 7/1996 | Jung |
| 5,559,557 A | 9/1996 | Kato |
| 5,565,920 A | 10/1996 | Lee et al. |
| 5,587,708 A | 12/1996 | Chiu |
| 5,606,371 A | 2/1997 | Gunnewick et al. |
| 5,623,424 A | 4/1997 | Azadegan et al. |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,724,456 A | 3/1998 | Boyack et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A | 3/1999 | Legall |
| 5,880,775 A | 3/1999 | Ross |
| 5,883,672 A | 3/1999 | Suzuki et al. |
| 5,926,791 A | 7/1999 | Ogata et al. |
| 5,969,764 A | 10/1999 | Sun et al. |
| 5,970,173 A | 10/1999 | Lee et al. |
| 5,990,957 A | 11/1999 | Ryoo |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Sugahara et al. |
| 6,088,392 A | 7/2000 | Rosenberg |
| 6,091,777 A | 7/2000 | Guetz et al. |
| 6,104,751 A | 8/2000 | Artieri |
| 6,118,817 A | 9/2000 | Wang |
| 6,118,903 A | 9/2000 | Liu |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Kolesnik et al. |
| 6,256,422 B1 | 7/2001 | Mitchell et al. |
| 6,256,423 B1 | 7/2001 | Krishnamurthy |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 | 4/2002 | Florencio et al. |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,977,659 B2 | 12/2005 | Dumitras et al. |
| 6,983,018 B1 | 1/2006 | Lin et al. |
| 6,990,242 B2 | 1/2006 | Malvar |
| 7,016,546 B2 | 3/2006 | Fukuhara et al. |
| 7,020,204 B2 | 3/2006 | Auvray et al. |
| 7,027,506 B2 | 4/2006 | Lee et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,099,389 B1 | 8/2006 | Yu et al. |
| 7,099,515 B2 | 8/2006 | Lin et al. |
| 7,110,455 B2 | 9/2006 | Wu et al. |
| 7,162,096 B1 | 1/2007 | Horowitz |
| 7,200,277 B2 | 4/2007 | Joshi et al. |
| 7,289,154 B2 | 10/2007 | Gindele |
| 7,295,609 B2 | 11/2007 | Sato et al. |
| 7,301,999 B2 | 11/2007 | Filippini et al. |

| | | |
|---|---|---|
| 7,307,639 B1 | 12/2007 | Dumitras et al. |
| 7,356,085 B2 | 4/2008 | Gavrilescu et al. |
| 7,463,780 B2 | 12/2008 | Fukuhara et al. |
| 7,471,830 B2 | 12/2008 | Lim et al. |
| 7,580,584 B2 | 8/2009 | Holcomb et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 | 8/2011 | Zuo et al. |
| 2001/0048718 A1 | 12/2001 | Bruls et al. |
| 2002/0021756 A1 | 2/2002 | Jayant et al. |
| 2002/0044602 A1 | 4/2002 | Ohki |
| 2002/0118748 A1 | 8/2002 | Inomata et al. |
| 2002/0118884 A1 | 8/2002 | Cho et al. |
| 2002/0136297 A1* | 9/2002 | Shimada et al. ......... 375/240.04 |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1 | 7/2003 | Srinivasan |
| 2003/0185420 A1 | 10/2003 | Sefcik et al. |
| 2003/0194010 A1 | 10/2003 | Mukerjee et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2003/0235247 A1 | 12/2003 | Wu et al. |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen |
| 2005/0031034 A1 | 2/2005 | Kamaci et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote |
| 2006/0126728 A1 | 6/2006 | Yu et al. |
| 2006/0133478 A1 | 6/2006 | Wen |
| 2006/0133479 A1 | 6/2006 | Chen et al. |
| 2006/0140267 A1 | 6/2006 | He et al. |
| 2006/0165176 A1 | 7/2006 | Raveendran et al. |
| 2006/0188014 A1* | 8/2006 | Civanlar et al. .......... 375/240.03 |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1 | 11/2006 | Lin et al. |
| 2006/0256851 A1 | 11/2006 | Wang et al. |
| 2006/0256867 A1 | 11/2006 | Turaga et al. |
| 2006/0257037 A1 | 11/2006 | Samadani |
| 2006/0268990 A1 | 11/2006 | Lin et al. |
| 2006/0268991 A1* | 11/2006 | Segall et al. ............. 375/240.24 |
| 2007/0002946 A1 | 1/2007 | Bouton et al. |
| 2007/0009039 A1 | 1/2007 | Ryu |
| 2007/0009042 A1 | 1/2007 | Craig et al. |
| 2007/0053603 A1 | 3/2007 | Monro |
| 2007/0081586 A1 | 4/2007 | Raveendran et al. |
| 2007/0081588 A1 | 4/2007 | Raveendran et al. |
| 2007/0140333 A1 | 6/2007 | Chono et al. |
| 2007/0147497 A1 | 6/2007 | Bao et al. |
| 2007/0160138 A1 | 7/2007 | Wedi et al. |
| 2007/0160151 A1 | 7/2007 | Bolton et al. |
| 2007/0189626 A1 | 8/2007 | Tanizawa et al. |
| 2007/0201553 A1 | 8/2007 | Shindo |
| 2007/0230565 A1 | 10/2007 | Tourapis et al. |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1 | 10/2007 | Zuo et al. |
| 2007/0258518 A1 | 11/2007 | Tu et al. |
| 2007/0258519 A1 | 11/2007 | Srinivasan |
| 2008/0008394 A1* | 1/2008 | Segall ........................... 382/238 |
| 2008/0031346 A1* | 2/2008 | Segall ...................... 375/240.19 |
| 2008/0068446 A1 | 3/2008 | Barkley et al. |
| 2008/0080615 A1 | 4/2008 | Tourapis et al. |
| 2008/0089410 A1 | 4/2008 | Lu et al. |
| 2008/0101465 A1 | 5/2008 | Chono et al. |
| 2008/0187042 A1 | 8/2008 | Jasinschi |
| 2008/0192822 A1 | 8/2008 | Chang et al. |
| 2008/0240235 A1 | 10/2008 | Holcomb et al. |
| 2008/0240250 A1 | 10/2008 | Lin et al. |
| 2008/0240257 A1 | 10/2008 | Chang et al. |
| 2008/0260278 A1 | 10/2008 | Zuo et al. |
| 2009/0207919 A1* | 8/2009 | Yin et al. ................. 375/240.25 |
| 2009/0213930 A1 | 8/2009 | Ye et al. |
| 2009/0245587 A1 | 10/2009 | Holcomb et al. |
| 2009/0290635 A1 | 11/2009 | Kim et al. |
| 2009/0296808 A1 | 12/2009 | Regunathan et al. |
| 2010/0177826 A1 | 7/2010 | Bhaumik et al. |

FOREIGN PATENT DOCUMENTS

| | | |
|---|---|---|
| EP | 0932306 | 7/1999 |
| EP | 1465349 | 10/2004 |
| EP | 1871113 | 12/2007 |
| GB | 897363 | 5/1962 |
| JP | 05-227525 | 9/1993 |
| JP | 07-222145 | 8/1995 |

| | | |
|---|---|---|
| JP | 07-250327 | 9/1995 |
| JP | 08-336139 | 12/1996 |
| JP | 10-336656 | 12/1998 |
| JP | 11-041610 | 2/1999 |
| JP | 2003061090 | 2/2003 |
| JP | 6-296275 | 10/2004 |
| JP | 2007-281949 | 10/2007 |
| KR | 132895 | 10/1998 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 | 10/2006 |
| WO | WO 2007/015047 | 2/2007 |
| WO | WO 2007/130580 | 11/2007 |

OTHER PUBLICATIONS

Chang et al., "Adaptive Wavelet Thresholding for Image Denoising and Compression," *IEEE Trans on Image Processing*, vol. 9, No. 9, pp. 1532-1546 (Sep. 2000).

Chrysafis et al., "Context-based Adaptive Image Coding," *Proc. of the 30th Asilomar Conf on Signals, Systems, and Computers*, 5 pp. (Nov. 1996).

De Simone, et al., "A comparative study of JPEG 2000, AVC/H.264, and HD Photo," *SPIE Optics and Photonics, Applications of Digital Image Processing XXX*, 12 pp. (Aug. 2007).

Gavrilescu et al., "Embedded Multiple Description Scalar Quantizers," *IEE Electronics Letters*, vol. 39, No. 13, 12 pp. (Jun. 2003).

Golner et al., "Region Based Variable Quantization for JPEG Image Compression," *IEEE Symp. on Circuits and Systems*, pp. 604-607 (Aug. 2000).

Hannuksela et al., "Sub-picture: ROI coding and unequal error protection," Proc. 2002 Int'l Conf. on Image Processing, vol. 3, Issue 24-28, pp. 537-540 (Jun. 2002).

Kopp, "Lossless Wavelet Based Image Compression with Adaptive 2D Decomposition," *Proc. 4th Int'l Conf in Central Europe on Computer Graphics and Visualization 96*, pp. 141-149 (Feb. 12-16, 1996).

Lei et al., "Rate Adaptation Transcoding for Precoded Video Streams," 13 pp. (month unknown, 2000).

Lin et al, "Low-complexity face-assisted coding scheme for low bit rate video telephony," *IEICE Trans. Inf. & Sys.*, vol. E86-D, No. 1, pp. 101-108 (Jan. 2003).

Lin et al, "Low-complexity face-assisted video coding," *Proc. 2000 Int'l Conf on Image Processing*, vol. 2, pp. 207-210 (Sep. 2000).

Luo et al., "A Scene Adaptive and Signal Adaptive Quantization for Subband Image and Video Compression Using Wavelets," *IEEE Trans. on Circuits and Systems for Video Tech.*, vol. 7, No. 2, pp. 343-357 (Apr. 1997).

Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).

Schallauer et al., "PRESTO—Preservation Technologies for European Broadcast Archives, D5.4—High Quality Compression for Film and Video," 80 pp. (Sep. 18, 2002).

Wang, et al., "A Framework for Adaptive Scalable Video Coding Using Wyner-Ziv Techniques," *EURASIP Journal on Applied Signal Processing*, pp. 1-18 (month unknown, 2006).

Watson et al., "Visibility of Wavelet Quantization Noise," *IEEE Trans. on Image Processing*, vol. 6, No. 8, pp. 1164-1175 (Aug. 1997).

Xiong et al., "Wavelet Packet Image Coding Using Space-Frequency Quantization," *IEEE Transactions on Image Processing*, vol. 7, No. 6, pp. 892-898 (Jun. 1998).

Calderbank et al., "Wavelet transforms that map integers to integers," Mathematics Subject Classification, Aug. 1996, 39 pages.

Donoho et al., "Data compression and Harmonic Analysis," IEEE transaction on information theory, vol. 44, No. 6, Oct. 1998, pp. 2435-2476.

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "CCITT Recommendation T.81: Information Technology—Digital Compresion and Coding of Continuous-Tone Still Images—Requirements and Guidelines," 190 pp. (Sep. 1992).

ITU-T, "ITU-T Recommendation T.84: Terminals for Telematic Services—Information Technology—Digital Compression and Coding of Continuous-Tone Still Images: Extensions," 84 pp. (Jul. 1996).

ITU-T, "ITU-T Recommendation T.801: JPEG 2000 image coding system: Extensions," 334 pp. (Aug. 2002).

Man et al., "Three-Dimensional Subband Coding Techniques for Wireless Video Communications," IEEE Trans. on Circuits and Systems for Video Technology, vol. 12, No. 6, pp. 386-397 (Jun. 2002).

Marcellin et al., "An overview of quantization in JPEG 2000," Signal Processing: Image Communication, vol. 17, pp. 73-84 (Jan. 2002).

Srinivasan et al., "HD Photo: A new image coding technology for digital photography," Proc. of SPIE, Vo. 6696, 19 pp. (Jan. 2007).

Tong, "A perceptually adaptive JPEG coder," Thesis, University of Toronto, 124 pp. (1997).

Watson, "Perceptual Optimization of DCT Color Quantization Matrices," IEEE Conf. on Image Processing, pp. 100-104 (Nov. 1994).

Yoo et al., "Adaptive Quantization of Image Subbands with Efficient Overhead Rate Selection," IEEE Conf. on Image Processing, pp. 361-364 (Sep. 1996).

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

Bist et al., "Adaptive Quantization for Low Bit Rate Video Coding," *Proc. 1998 Int'l Conf on Image Processing* (ICIP 98), pp. 925-928 (1998).

Farvardin et al., "Optimum quantizer performance for a class of non-Gaussian memoryless sources," *IEEE Trans. Inform. Theory*, vol. IT-30, No. 3, pp. 485-497 (May 1984).

Flierl et al., "A Video Codec Incorporating Block-Based Multi-Hypothesis Motion-Compensated Prediction," in *Proceedings of the SPIE Conference on Visual Communications and image Processing*, Perth, Australia, vol. 4067, pp. 238-249 (Jun. 2000).

Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).

Foos et al., "JPEG 2000 compression of medical imagery," *Proc. SPIE*, vol. 3980, pp. 85-96 (2000).

Garrigues et al., "Atom position coding in a matching pursuit based video coder," *Lecture Notes in Computer Science*, 4 pp. (2005).

Gish et al., "Asymptotically efficient quantizing," *IEEE Trans. Inform. Theory*, vol. IT-14, No. 5 (Sep. 1968).

Golston et al., "Video codecs tutorial: Trade-offs with H.264, VC-1 and other advanced codecs," *Video/Imaging Design Line*, 9 pp. (Mar. 2006).

"H.264 & IPTV Over DSL—Enabling New Telco Revenue Opportunities," *White Paper*, Intel/Envivio, May 15, 2004, available at http://www.envivio.com/images/products/H264whitepaper.pdf.

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (1993).

"ISO/IEC 13818-2. Generic coding of moving pictures and associated audio information," MPEG (Moving Pictures Expert Group), International Organization for Standardization, MPEG2 Video (1994).

ISO/IEC, "14496-2: Information Technology—Coding of Audio-Visual Objects—Part 2: Visual," 724 pp. (2004).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," *IEEE Signal Proc. Letters*, vol. SPL-2, No. 5, pp. 81-82 (May 1995).

Kim et al., "Still image coding based on vector quantization and fractal approximation," *IEEE Transactions on Image Processing*, vol. 5, No. 4, pp. 587-597 (1996).

Lam et al., "A mathematical analysis of the DCT coefficient distributions for images," *IEEE Trans. Image Proc.*, vol. IP-9, No. 10, pp. 1661-1666 (Oct. 2000).

LeGall, "MPEG: A Video Compression Standard for Multimedia Application," *Communications of the ACM*, vol. 34, No. 4, pp. 47-58 (Apr. 1991).

LeGall, "The MPEG Video Compression Algorithm," *Signal Processing: Image Communication 4*, vol. 4, No. 2, pp. 129-140 (Apr. 1992).

LeGall et al., "Transmission of HDTV signals under 140 Mbit/s using a subband decomposition and Discrete Cosine Transform coding," in *Signal Processing of HDTV*, Elsevier, Amsterdam, pp. 287-293 (1988).

Limb, "A Picture-Coding Algorithm for the Merli Scan," *IEEE Transactions on Communications*, pp. 300-305 (Apr. 1973).

Lloyd, "Least squares quantization in PCM," *IEEE Trans. Inform. Theory*, vol. IT-28, No. 2, pp. 7-12 (Mar. 1982) (reprint of work originally presented in Jul. 1957).

Loomis, "Using the Advanced Settings of the Windows Media Video 9 Advanced Profile Codec," 13 pp. (Document dated Apr. 2006) [Downloaded from the World Wide Web on May 31, 2007].

Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Mallat, "A theory for multiresolution signal decomposition: the wavelet representation," *IEEE Trans. Pattern Anal. and Machine Intell.*, vol. PAMI-11, No. 7, pp. 674-692 (Jul. 1989).

Masala et al., "Perceptually Optimized MPEG Compression of Synthetic Video Sequences," *Proc. ICIP*, pp. I-601-I-604 (2005).

Max, "Quantizing for minimum distortion," *IEEE Trans. Inform. Theory*, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitra et al., "Two-Stage Color Palettization for Error Diffusion," *Proceedings of SPIE*, pp. 207-217 (Jun. 2002).

Mook, "Next-Gen Windows Media Player Leaks to the Web," *BetaNews*, 17 pp. (Jul. 19, 2002) [Downloaded from the World Wide Web on Aug. 8, 2003].

Muller, "Distribution shape of two-dimensional DCT coefficients of natural images," *IEE Electronics Letters*, vol. 29, No. 22 (Oct. 1993).

Murakami et al., "Comparison between DPCM and Hadamard transform coding in the composite coding of the NTSC color TV signal," *IEEE Trans. On Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).

Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Park et al., "A post processing method for reducing quantization effects in low bit-rate moving picture coding," *IEEE Trans. Circuits Syst. Video Technology*, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Reininger et al., "Distribution of two-dimensional DCT coefficients for images," *IEEE Trans. On Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shen et al., "Rate-Distortion Optimization for Fast Hierarchical B-Picture Transcoding," *IEEE*, pp. 5279-5282 (2006).

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sony Electronics Inc., "Sony Vizaro DVD Encoder System DVA-V700," 4 pp. (2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Tsang et al., "Fuzzy Based Rate Control for Real-Time MPEG Video," *IEEE Transactions on Fuzzy Systems*, pp. 504-516 (1998).

Wien, "Variable Block-Size Transforms for Hybrid Video Coding," Dissertation, 182 pp. (Feb. 2004).

Wu et al., "Context-based adaptive lossless codec," *IEEE Trans. Communications*, vol. 45, pp. 437-444 (1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (1998).

Zaid et al., "Wavelet Image Coding with Adaptive Thresholding," 4 pp. (2002).

Zhang et al., "Adaptive Field/Frame Selection for High Compression Coding," *SPIE Conf. on Image and Video Communications and Processing*, 13 pp. (Jan. 2002).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

Eleftheriadis et al., "Dynamic Rate Shaping of Compressed Digital Video," IEEE Transactions on Multimedia, vol. 8, No. 2, Apr. 2006, pp. 297-314.

Lee et al., "Spatio-Temporal Model-Assisted Compatible Coding for Law and Very Low Bitrate Videotelephony," 3rd IEEE International Conference on Image Processing, 4 pages, Sep. 1996.

Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.

Richardson, H.264 and MPEG-4 Video Compression, pp. 50-56 and 187-196 (2003).

\* cited by examiner

Software 980 implementing described techniques and tools for adaptive quantization

ADAPTIVE SELECTION OF PICTURE-LEVEL QUANTIZATION PARAMETERS FOR PREDICTED VIDEO PICTURES

BACKGROUND

With the increasing popularity of DVDs, music and video delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality of media information, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Resolution generally refers to the number of samples over some duration of time (for audio) or space (for images or individual video pictures). Images with higher resolution tend to look crisper than other images and contain more discernable useful details. Frame rate is a common term for temporal resolution for video. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits per pixel (sample depth times samples per pixel) | Resolution (pixels, width × height) | Frame rate (frames per second) | Bit rate (millions of bits per second) |
| --- | --- | --- | --- |
| 8 (value 0-255, monochrome) | 160 × 120 | 7.5 | 1.2 |
| 24 (value 0-255 each, RGB) | 320 × 240 | 15 | 27.6 |
| 24 (value 0-255 each, RGB) | 640 × 480 | 30 | 221.2 |
| 24 (value 0-255 each, RGB) | 1280 × 720 | 60 | 1327.1 |

Despite the high bit rate necessary for storing and sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Compression can be lossless, in which quality of the video does not suffer but decreases in bit rate are limited by the complexity of the video. Or, compression can be lossy, in which quality of the video suffers but decreases in bit rate are more dramatic. Decompression (also called decoding) reconstructs a version of the original information from the compressed form. An encoder/decoder system is sometimes referred to as a "codec."

In general, video compression techniques include "intra" compression and "inter" or predictive compression. For video frames, intra compression techniques compress individual frames, typically called I-frames or key frames. Inter compression techniques compress frames with reference to preceding and/or following frames, and inter-compressed frames are typically called predicted frames, P-frames, or B-frames.

II. Inter and Intra Compression in Windows Media Video, Versions 8 and 9

Microsoft Corporation's Windows Media Video, Version 8 ("WMV8") includes a video encoder and a video decoder. The WMV8 encoder uses intra and inter compression, and the WMV8 decoder uses intra and inter decompression. Windows Media Video, Version 9 ("WMV9") uses a similar architecture for many operations.

A. Intra Compression

FIG. 1 illustrates block-based intra compression (100) of a block (105) of samples in a key frame in the WMV8 encoder. A block is a set of samples, for example, an 8×8 arrangement of samples. The WMV8 encoder splits a key video frame into 8×8 blocks and applies an 8×8 Discrete Cosine Transform ("DCT") (110) to individual blocks such as the block (105). A DCT is a type of frequency transform that converts the 8×8 block of samples (spatial information) into an 8×8 block of DCT coefficients (115), which are frequency information. The DCT operation itself is lossless or nearly lossless. Compared to the original sample values, however, the DCT coefficients are more efficient for the encoder to compress since most of the significant information is concentrated in low frequency coefficients (conventionally, the upper left of the block (115)) and many of the high frequency coefficients (conventionally, the lower right of the block (115)) have values of zero or close to zero.

The encoder then quantizes (120) the DCT coefficients, resulting in an 8×8 block of quantized DCT coefficients (125). Quantization is lossy. Since low frequency DCT coefficients tend to have higher values, quantization typically results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients (125) for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient (126) as a differential from the DC coefficient (136) of a neighboring 8×8 block, which is a previously encoded neighbor (e.g., top or left) of the block being encoded. (FIG. 1 shows a neighbor block (135) that is situated to the left of the block being encoded in the frame.) The encoder entropy encodes (140) the differential.

The entropy encoder can encode the left column or top row of AC coefficients as a differential from a corresponding left column or top row of the neighboring 8×8 block. This is an example of AC coefficient prediction. FIG. 1 shows the left column (127) of AC coefficients encoded as a differential (147) from the left column (137) of the neighboring (in reality, to the left) block (135). The differential coding increases the chance that the differential coefficients have zero values. The remaining AC coefficients are from the block (125) of quantized DCT coefficients.

The encoder scans (150) the 8×8 block 145 of quantized AC DCT coefficients into a one-dimensional array (155) and then entropy encodes the scanned AC coefficients using a variation of run length coding (160). The encoder selects an entropy code from one or more run/level/last tables (165) and outputs the entropy code.

B. Inter Compression

Inter compression in the WMV8 encoder uses block-based motion compensated prediction coding followed by transform coding of the residual error. FIGS. 2 and 3 illustrate the block-based inter compression for a predicted frame in the WMV8 encoder. In particular, FIG. 2 illustrates motion estimation for a predicted frame (210) and FIG. 3 illustrates compression of a prediction residual for a motion-compensated block of a predicted frame.

For example, in FIG. 2, the WMV8 encoder computes a motion vector for a macroblock (215) in the predicted frame (210). To compute the motion vector, the encoder searches in a search area (235) of a reference frame (230). Within the search area (235), the encoder compares the macroblock (215) from the predicted frame (210) to various candidate macroblocks in order to find a candidate macroblock that is a good match. The encoder outputs information specifying the motion vector (entropy coded) for the matching macroblock. The motion vector is differentially coded with respect to a motion vector predictor. The prediction is rarely perfect, so the encoder usually encodes blocks of differences (also called the error or residual blocks) between the prediction macroblock and the macroblock (215) itself.

FIG. 3 illustrates an example of computation and encoding of an error block (335) in the WMV8 encoder. The error block (335) is the difference between the predicted block (315) and the original current block (325). The encoder applies a DCT (340) to the error block (335), resulting in an 8×8 block (345) of coefficients. The encoder then quantizes (350) the DCT coefficients, resulting in an 8×8 block of quantized DCT coefficients (355). The encoder scans (360) the 8×8 block (355) into a one-dimensional array (365) such that coefficients are generally ordered from lowest frequency to highest frequency. The encoder entropy encodes the scanned coefficients using a variation of run length coding (370). The encoder selects an entropy code from one or more run/level/last tables (375) and outputs the entropy code.

FIG. 4 shows an example of a corresponding decoding process (400) for an inter-coded block. In summary of FIG. 4, a decoder decodes (410, 420) entropy-coded information representing a prediction residual using variable length decoding (410) with one or more run/level/last tables (415) and run length decoding (420). The decoder inverse scans (430) a one-dimensional array (425), storing the entropy-decoded information into a two-dimensional block (435). The decoder inverse quantizes and inverse DCTs (together, 440) the data, resulting in a reconstructed error block (445). In a separate motion compensation path, the decoder computes a predicted block (465) using motion vector information (455) for displacement from a reference frame. The decoder combines (470) the predicted block (465) with the reconstructed error block (445) to form the reconstructed block (475). An encoder also performs the inverse quantization, inverse DCT, motion compensation and combining to reconstruct frames for use as reference frames.

III. Lossy Compression and Quantization

The preceding section mentioned quantization, a mechanism for lossy compression, and lossless compression. Lossless compression reduces the bit rate of information by removing redundancy from the information without any reduction in fidelity. Lossless compression techniques reduce bit rate at no cost to quality, but can only reduce bit rate up to a certain point. Decreases in bit rate are limited by the inherent amount of variability in the statistical characterization of the input data, which is referred to as the source entropy.

In contrast, with lossy compression, the quality suffers somewhat but the achievable decrease in bit rate is more dramatic. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression—e.g., in a system design in which lossy compression establishes an approximation of the information and lossless compression techniques are applied to represent the approximation.

According to one possible definition, quantization is a term used for an approximating non-reversible mapping function commonly used for lossy compression, in which there is a specified set of possible output values, and each member of the set of possible output values has an associated set of input values that result in the selection of that particular output value. In general, an encoder varies quantization to trade off quality and bit rate. Coarser quantization results in greater quality reduction but allows for greater bit rate reduction.

In many systems, the extent of quantization is measured in terms of quantization step size. Coarser quantization uses larger quantization step sizes, corresponding to wider ranges of input values. Finer quantization uses smaller quantization step sizes. Often, for purposes of signaling and reconstruction, quantization step sizes are parameterized as multiples of a smallest quantization step size. Quantization step sizes may be represented by quantization indexes.

Different reconstruction rules may be used to determine the reconstruction value for each quantization index. Standards and product specifications that focus only on achieving interoperability will often specify reconstruction values without necessarily specifying the classification rule. In other words, some specifications may define the functional mapping $k \rightarrow \beta[k]$ without defining the functional mapping $x \rightarrow A[x]$. This allows a decoder built to comply with the standard/specification to reconstruct information correctly. In contrast, encoders are often given the freedom to change the classifier in any way that they wish, while still complying with the standard/specification.

A variety of quantization techniques have been developed, including scalar or vector, uniform or non-uniform, and adaptive or non-adaptive quantization.

A. Scalar Quantizers

According to one possible definition, a scalar quantizer is an approximating functional mapping $x \rightarrow Q[x]$ of an input value x to a quantized value Q[x], sometimes called a reconstructed value. FIG. 5 shows a "staircase" I/O function (500)

for a scalar quantizer. The horizontal axis is a number line for a real number input variable x, and the vertical axis indicates the corresponding quantized values Q[x]. The number line is partitioned by thresholds such as the threshold (510). Each value of x within a given range between a pair of adjacent thresholds is assigned the same quantized value Q[x]. For example, each value of x within the range (520) is assigned the same quantized value (530). (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 5) or non-uniformly spaced.

A scalar quantizer can be decomposed into two distinct stages. The first stage is the classifier stage, in which a classifier function mapping x→A[x] maps an input x to a quantization index A[x], which is often integer-valued. In essence, the classifier segments an input number line or data set. FIG. 6A shows a generalized classifier (600) and thresholds for a scalar quantizer. As in FIG. 5, a number line for a real number variable x is segmented by thresholds such as the threshold (610). Each value of x within a given range such as the range (620) is assigned the same quantized value Q[x]. FIG. 6B shows a numerical example of a classifier (650) and thresholds for a scalar quantizer.

In the second stage, a reconstructor functional mapping k→β[k] maps each quantization index k to a reconstruction value β[k]. In essence, the reconstructor places steps having a particular height relative to the input number line segments (or selects a subset of data set values) for reconstruction of each region determined by the classifier. The reconstructor functional mapping may be implemented, for example, using a lookup table. Overall, the classifier relates to the reconstructor as follows:

$$Q[x] = \beta[A[x]] \quad (1).$$

In common usage, the term "quantization" is often used to describe the classifier stage, which is performed during encoding. The term "inverse quantization" is similarly used to describe the reconstructor stage, whether performed during encoding or decoding.

The distortion introduced by using such a quantizer may be computed with a difference-based distortion measure d(x−Q[x]). Typically, such a distortion measure has the property that d(x−Q[x]) increases as x−Q[x] deviates from zero; and typically each reconstruction value lies within the range of the corresponding classification region, so that the straight line that would be formed by the functional equation Q[x]=x will pass through every step of the staircase diagram (as shown in FIG. 5) and therefore Q[Q[x]] will typically be equal to Q[x]. In general, a quantizer is considered better in rate-distortion terms if the quantizer results in a lower average value of distortion than other quantizers for a given bit rate of output.

B. Dead Zone+Uniform Threshold Quantizers

A non-uniform quantizer has threshold values that are not uniformly spaced for all classifier regions. According to one possible definition, a dead zone plus uniform threshold quantizer ("DZ+UTQ") is a quantizer with uniformly spaced threshold values for all classifier regions except the one containing the zero input value (which is called the dead zone). In a general sense, a DZ+UTQ is a non-uniform quantizer, since the dead zone size is different than the other classifier regions.

A DZ+UTQ has a classifier index mapping rule x→A[x] that can be expressed based on two parameters. FIG. 7 shows a staircase I/O function (700) for a DZ+UTQ, and FIG. 8A shows a generalized classifier (800) and thresholds for a DZ+UTQ. The parameter s, which is greater than 0, indicates the step size for all steps other than the dead zone. Mathematically, all $s_i$ are equal to s for i≠0. The parameter z, which is greater than or equal to 0, indicates the ratio of the dead zone size to the size of the other steps. Mathematically, $s_0 = z \cdot s$. In FIG. 8A, z is 2, so the dead zone is twice as wide as the other classification zones. The index mapping rule x→A[x] for a DZ+UTQ can be expressed as:

$$A[x] = \text{sign}(x) * \max\left(0, \left\lfloor \frac{|x|}{s} - \frac{z}{2} + 1 \right\rfloor\right), \quad (2)$$

where $\lfloor \cdot \rfloor$ denotes the smallest integer less than or equal to the argument and where sign(x) is the function defined as:

$$\text{sign}(x) = \begin{cases} +1, & \text{for } x \geq 0, \\ -1 & \text{for } x < 0. \end{cases} \quad (3)$$

FIG. 8B shows a numerical example of a classifier (850) and thresholds for a DZ+UTQ with s=1 and z=2. FIGS. 5, 6A, and 6B show a special case DZ+UTQ with z=1. Quantizers of the UTQ form have good performance for a variety of statistical sources. In particular, the DZ+UTQ form is optimal for the statistical random variable source known as the Laplacian source.

C. Perceptual Effects of Quantization

As mentioned above, lossy compression tends to cause a decrease in quality. For example, a series of ten samples of slightly different values can be approximated using quantization as ten samples with exactly the same particular approximate value.

This kind of quantization can reduce the bit rate of encoding the series of ten samples, but at the cost of lost detail in the original ten samples.

In some cases, quantization produces visible artifacts that tend to be more artificial-looking and visually distracting than simple loss of fine detail. For example, smooth, un-textured content is susceptible to contouring artifacts—artifacts that appear between regions of two different quantization output values—because the human visual system is sensitive to subtle variations (particularly luma differences) in smooth content.

Another perceptual effect of quantization occurs when average quantization step sizes are varied between frames in a sequence. Although the flexibility to change quantization step sizes can help control bit rate, an unpleasant "flicker" effect can occur when average quantization step sizes vary too much from frame to frame and the difference in quality between frames becomes noticeable. Furthermore, devoting too much bit rate to frames or regions that are not perceptually important can cause shortages in available bit rate for more important frames or regions.

V. Inverse Quantization in VC-1

VC-1 is a video codec standard that specifies certain rules for inverse uantization. The encoder sends a picture-level bitstream element, PQINDEX, to indicate a base quantization step size (also referred to herein as a quantization parameter or QP) for the picture ("picture QP"). PQINDEX is present for all picture types, including I-pictures, P-pictures and B-pictures. Although VC-1 does not specify how the value of PQINDEX should be determined for different pictures, the value of PQINDEX (and, therefore, the QP for the picture) can vary for different picture types. Typically, lower QPs are used for I-pictures, and higher QPs are used for predicted pictures.

In differential quantization, the encoder varies QPs for different parts of a picture. Typically, this involves varying QPs on a macroblock level or other sub-picture level. The encoder makes decisions on how to vary the QPs, and signals those decisions, as appropriate, to a decoder. In VC-1, the encoder sends a bitstream element (DQUANT) at a syntax level above picture level to indicate differential quantization status. If DQUANT=0, the QP indicated by PQINDEX is used for all macroblocks in the picture. If DQUANT=1 or 2, different macroblocks in the same picture can use different QPs.

A VC-1 encoder can use more than one approach to differential quantization. In one approach, only two different QPs are used for a picture. This is referred to as bi-level differential quantization. For example, one QP is used for macroblocks at picture edges and another QP is used for macroblocks in the rest of the picture. This can be useful for saving bits at picture edges, where fine detail is less important for maintaining overall visual quality. Or, a 1-bit value signaled per macroblock indicates which of two available QP values to use for the macroblock. In another approach, referred to as multi-level differential quantization, a larger number of different QPs can be used for individual macroblocks in a picture.

V. Other Standards and Products

Various video standards allow the use of different quantization step sizes for different picture types, and allow variation of quantization step sizes for rate and quality control. Standards typically do not fully specify the quantizer design.

Numerous systems for adjusting quantization thresholds have been developed. Many standards and products specify reconstruction values that correspond to a typical mid-point reconstruction rule (e.g., for a typical simple classification rule) for the sake of simplicity. For classification, however, the thresholds can in fact be adjusted so that certain input values will be mapped to more common (and hence, lower bit rate) indices, which makes the reconstruction values closer to optimal.

Numerous international standards specify aspects of video decoders and formats for compressed video information. Directly or by implication, these standards also specify certain encoder details, but other encoder details are not specified. Some standards address still image compression/decompression, and other standards address audio compression/decompression. Numerous companies have produced encoders and decoders for audio, still images, and video. Various other kinds of signals (for example, hyperspectral imagery, graphics, text, financial information, etc.) are also commonly represented and stored or transmitted using compression techniques.

Given the critical importance of compression to digital video, it is not surprising that video compression is a richly developed field. Whatever the benefits of previous video compression techniques, however, they do not have the advantages of the following techniques and tools.

SUMMARY

The present application describes techniques and tools for adaptive selection of picture quantization parameters ("QPs") for predicted pictures. For example, a video encoder adaptively selects a delta QP for a B-picture based on spatial complexity, temporal complexity, whether differential quantization is active, whether the B-picture is available as a reference picture, or some combination or subset of these or other factors. The delta QP can then be used to adjust the picture QP for the B-picture (e.g., to reduce bit rate for the B-picture without appreciably reducing the perceived quality of a video sequence).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

The present application relates to techniques and tools for efficient compression of video. In various described embodiments, a video encoder incorporates techniques for encoding video, and corresponding signaling techniques for use with a bitstream format or syntax comprising different layers or levels. Described techniques and tools can be applied to interlaced or progressive frames. A decoder can perform corresponding decoding.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

The various techniques and tools can be used in combination or independently. Different embodiments implement one or more of the described techniques and tools. Some techniques and tools described herein can be used in a video encoder, or in some other system not specifically limited to video encoding.

I. Computing Environment

Figure 1:
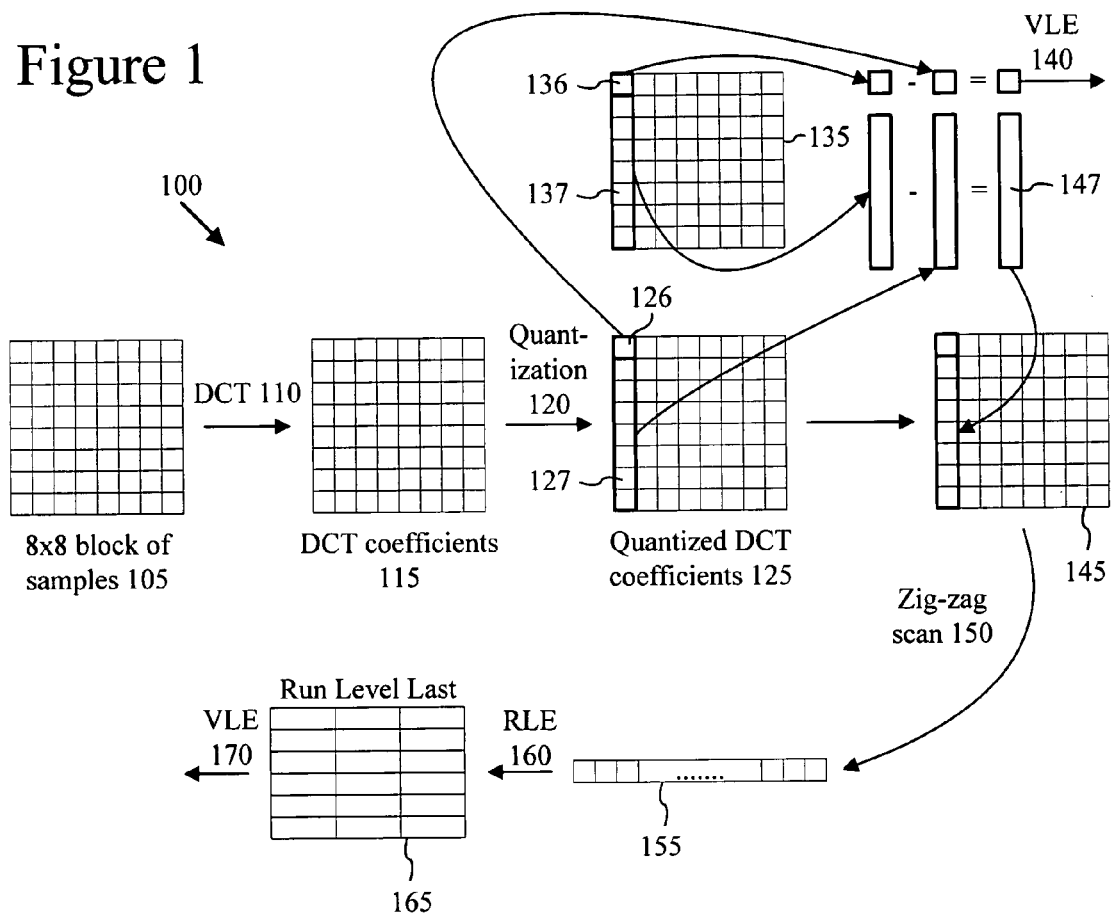
FIG. 1 is a diagram showing block-based intraframe compression of an 8×8 block of samples according to the prior art.
Figure 2:
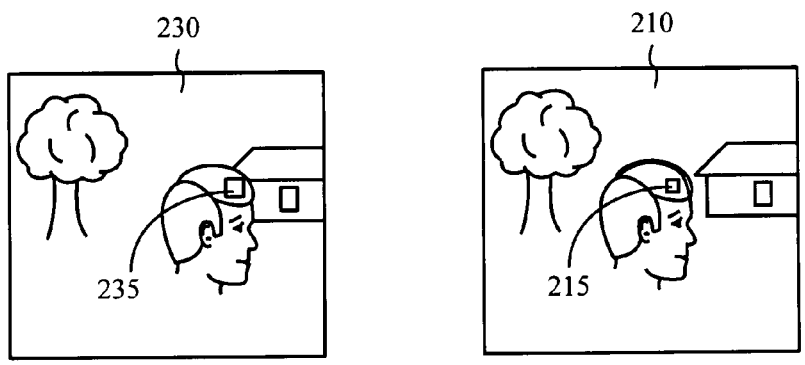
FIG. 2 is a diagram showing motion estimation in a video encoder according to the prior art.
Figure 3:
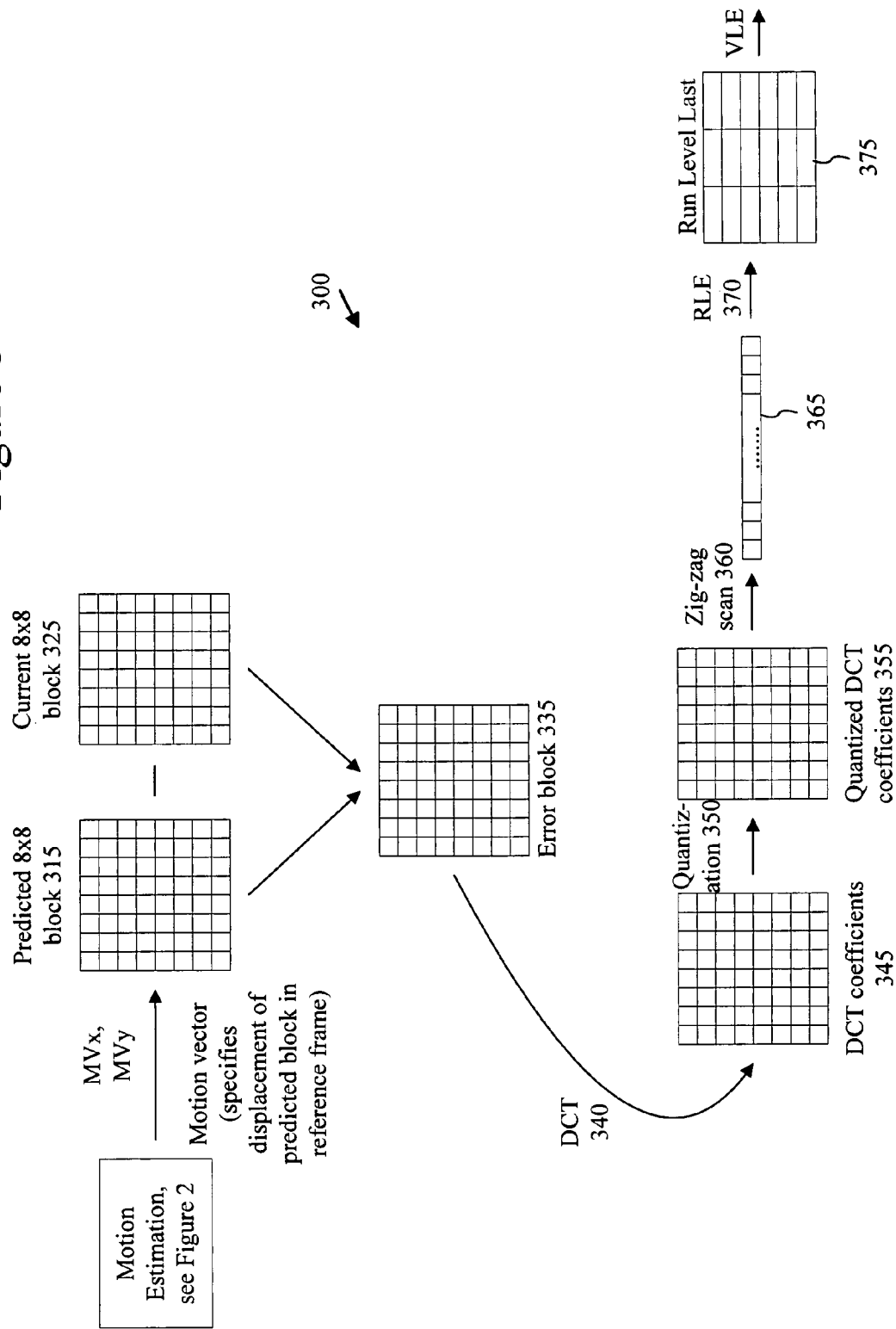
FIG. 3 is a diagram showing block-based compression for an 8×8 block of prediction residuals in a video encoder according to the prior art.
Figure 4:
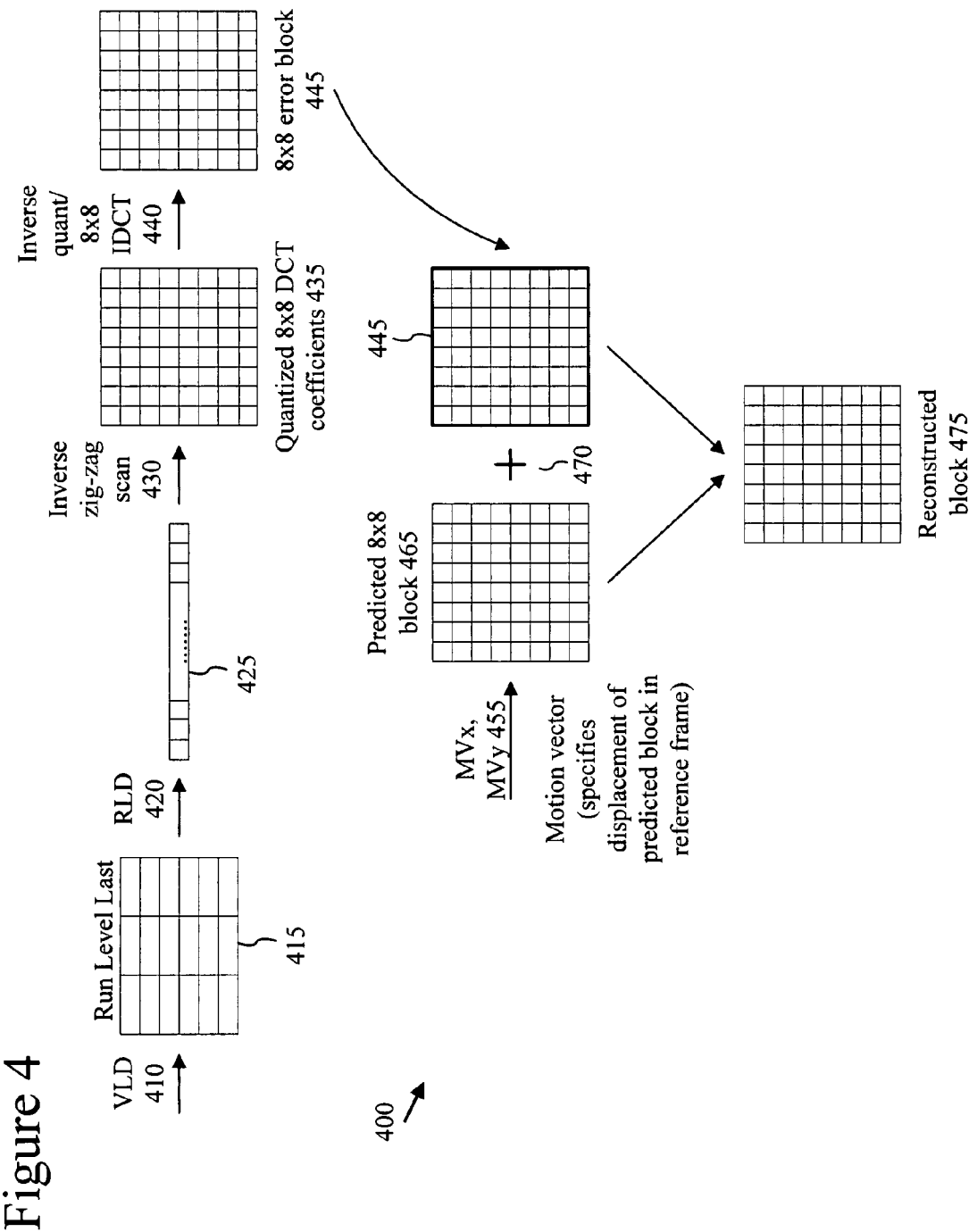
FIG. 4 is a diagram showing block-based decompression for an 8×8 block of prediction residuals in a video decoder according to the prior art.
Figure 5:
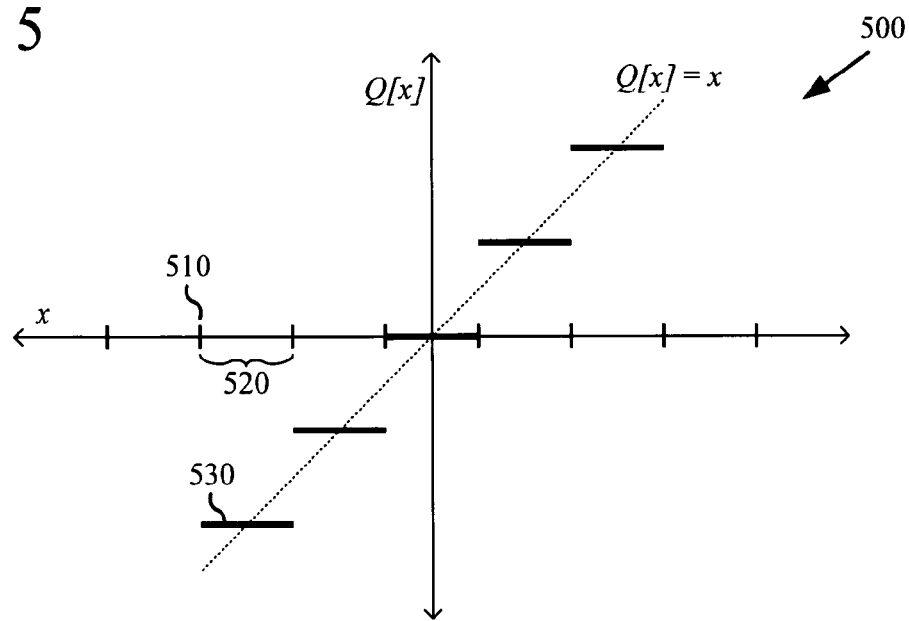
FIG. 5 is a chart showing a staircase I/O function for a scalar quantizer according to the prior art.
Figure 6A:
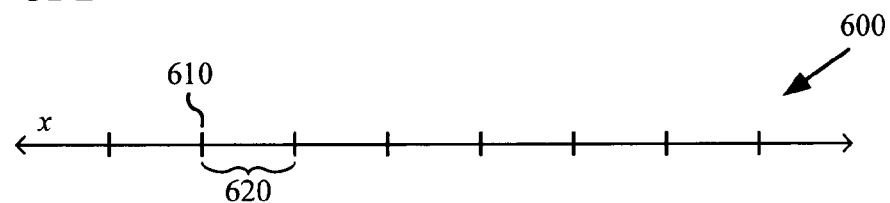
FIGS. 6A and 6B are charts showing classifiers and thresholds for scalar quantizers according to the prior art.
Figure 6B:
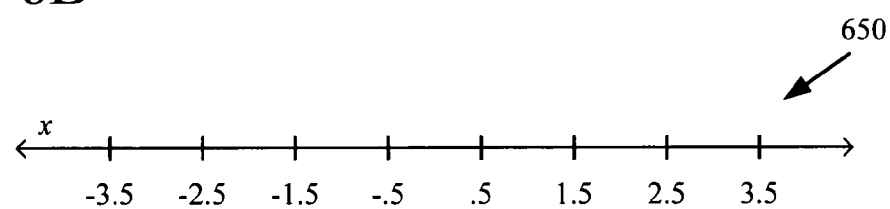
Figure 7:
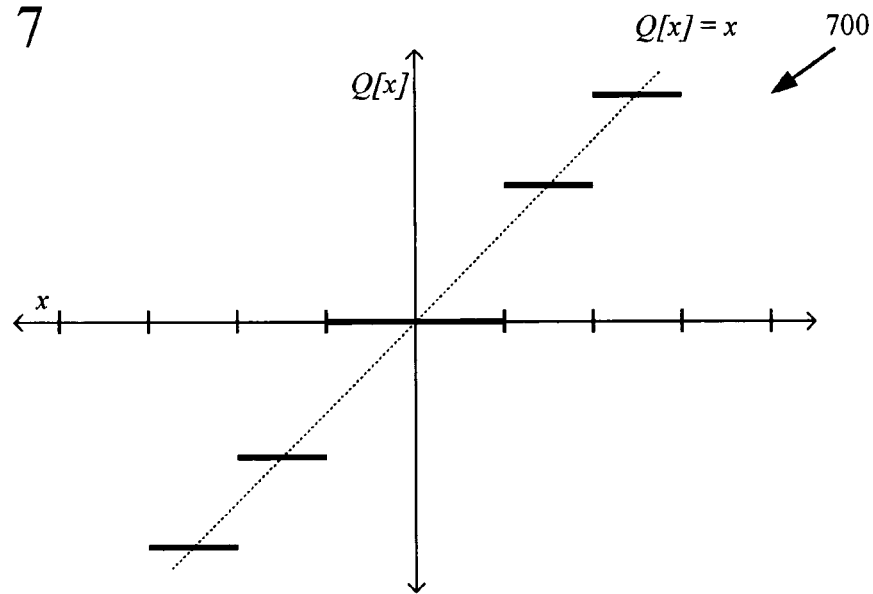
FIG. 7 is a chart showing a staircase I/O function for a DZ+UTQ according to the prior art.
Figure 8A:
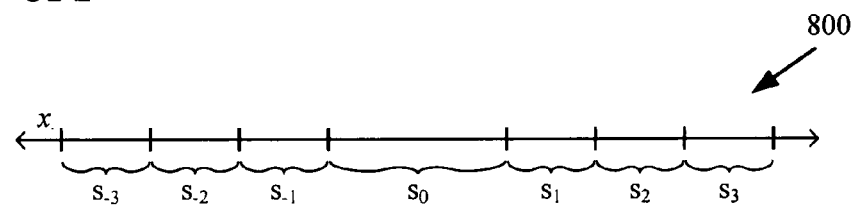
FIGS. 8A and 8B are charts showing classifiers and thresholds for DZ+UTQs according to the prior art.
Figure 8B:
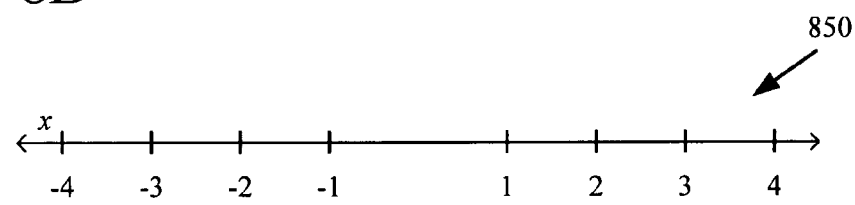
Figure 9:
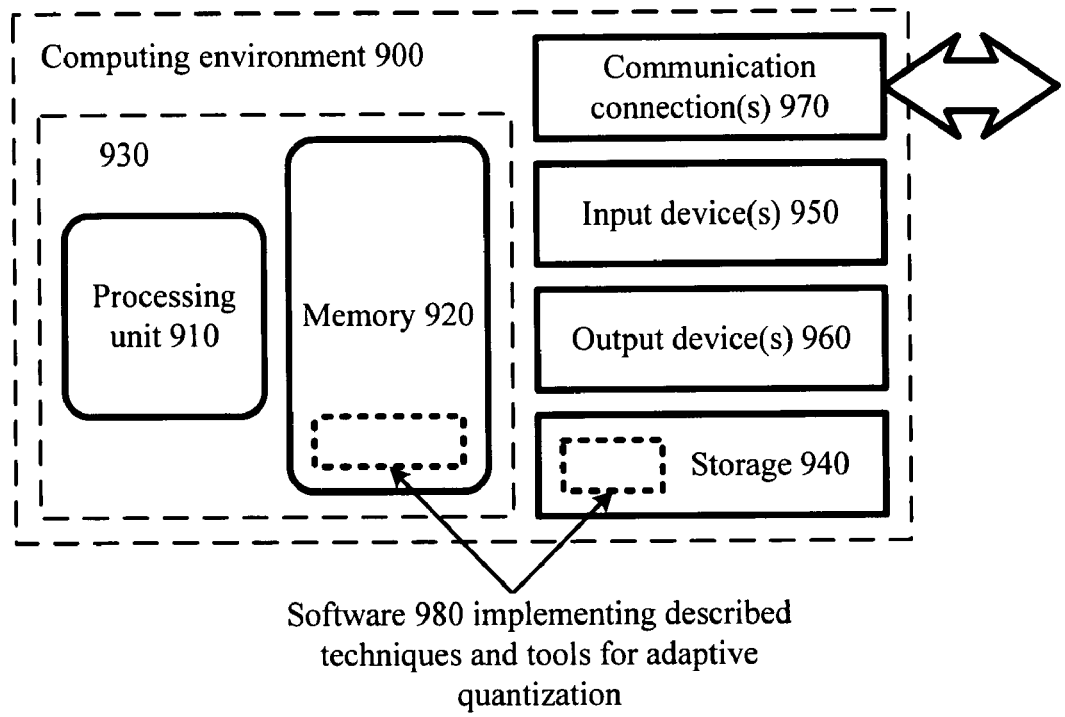
FIG. 9 is a block diagram of a suitable computing environment in conjunction with which several described embodiments may be implemented.

FIG. 9 illustrates a generalized example of a suitable computing environment (900) in which several of the described embodiments may be implemented. The computing environment (900) is not intended to suggest any limitation as to scope of use or functionality, as the techniques and tools may be implemented in diverse general-purpose or special-purpose computing environments.

With reference to FIG. 9, the computing environment (900) includes at least one processing unit (910) and memory (920). In FIG. 9, this most basic configuration (930) is included within a dashed line. The processing unit (910) executes computer-executable instructions and may be a real or a virtual processor. In a multi-processing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing a video encoder or post-encoding application with one or more of the described techniques and tools for adaptive quantization.

A computing environment may have additional features. For example, the computing environment (900) includes storage (940), one or more input devices (950), one or more output devices (960), and one or more communication connections (970). An interconnection mechanism (not shown) such as a bus, controller, or network interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, magnetic tapes or cassettes, CD-ROMs, DVDs, or any other medium which can be used to store information and which can be accessed within the computing environment (900). The storage (940) stores instructions for the software (980).

The input device(s) (950) may be a touch input device such as a keyboard, mouse, pen, or trackball, a voice input device, a scanning device, or another device that provides input to the computing environment (900). For audio or video encoding, the input device(s) (950) may be a sound card, video card, TV tuner card, or similar device that accepts audio or video input in analog or digital form, or a DVD, CD-ROM or CD-RW that reads audio or video samples into the computing environment (900). The output device(s) (960) may be a display, printer, speaker, DVD- or CD-writer, or another device that provides output from the computing environment (900).

The communication connection(s) (970) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (900), computer-readable media include memory (920), storage (940), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "receive" and "select" to describe computer operations in a computing environment. These terms are high-level abstractions for operations performed by a computer, and should not be confused with acts performed by a human being. The actual computer operations corresponding to these terms vary depending on implementation.

II. Generalized Video Encoder

Figure 10:
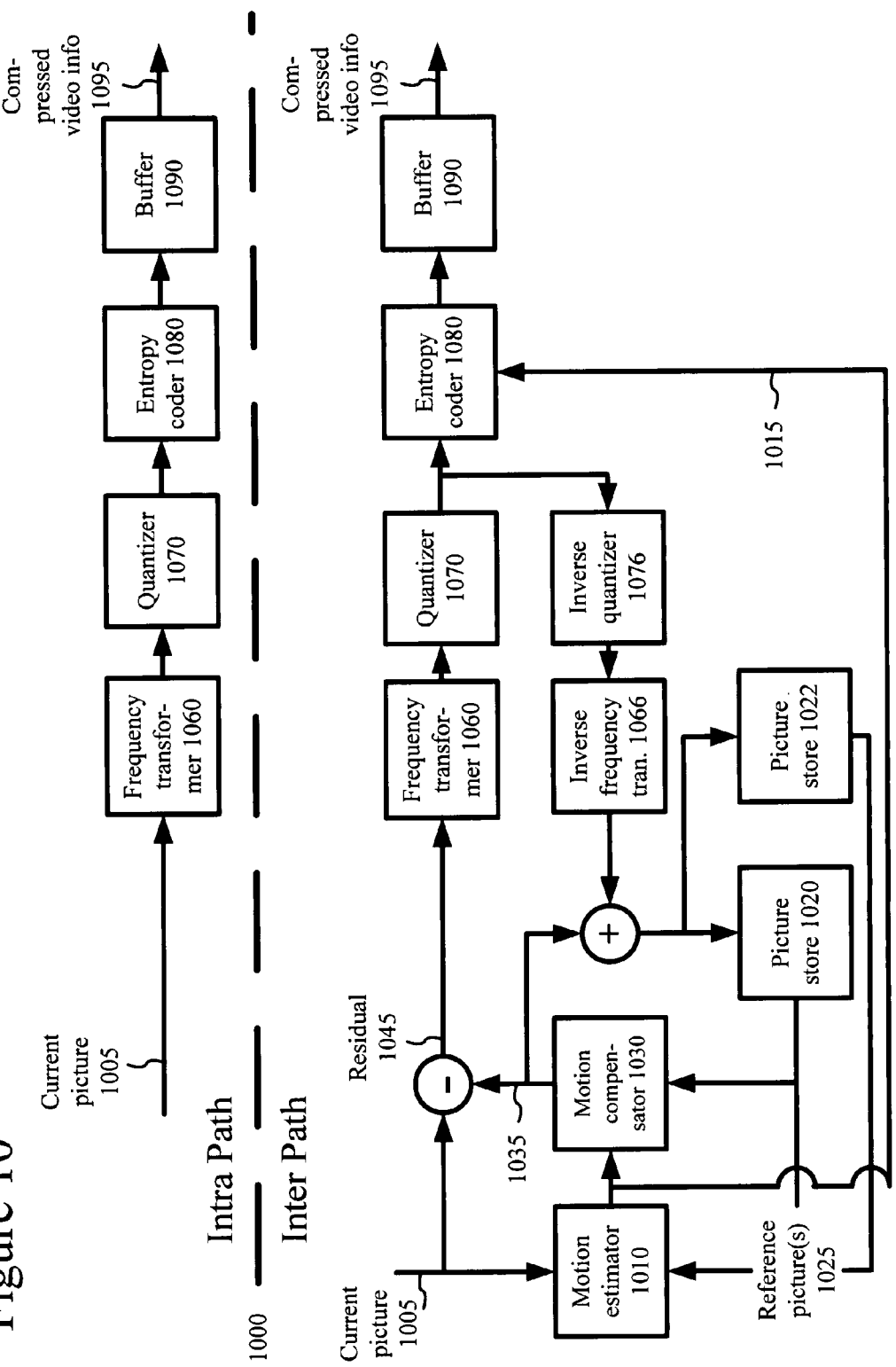
FIG. 10 is a block diagram of a generalized video encoder system in conjunction with which several described embodiments may be implemented.

FIG. 10 is a block diagram of a generalized video encoder (1000) in conjunction with which some described embodiments may be implemented. The encoder (1000) receives a sequence of video pictures including a current picture (1005) and produces compressed video information (1095) as output to storage, a buffer, or a communication connection. The format of an output bitstream can be a Windows Media Video or VC-1 format, MPEG-x format (e.g., MPEG-1, MPEG-2, or MPEG-4), H.26x format (e.g., H.261, H.262, H.263, or H.264), or other format.

Figure 11:
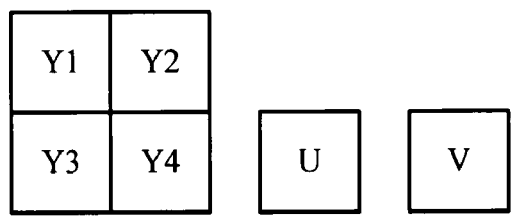
FIG. 11 is a diagram of a macroblock format used in several described embodiments.

The encoder (1000) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder (1000) is block-based and uses a 4:2:0 macroblock format for frames. As shown in FIG. 11, macroblock (1100) includes four 8×8 luminance (or luma) blocks (Y1 through Y4) and two 8×8 chrominance (or chroma) blocks (U and V) that are co-located with the four luma blocks but half resolution horizontally and vertically, following the conventional 4:2:0 macroblock format. For fields, the same or a different macroblock organization and format may be used. The 8×8 blocks may be further sub-divided at different stages, e.g., at the frequency transform and entropy encoding stages. The encoder (1000) can perform operations on sets of samples of different size or configuration than 8×8 blocks and 16×16 macroblocks. Alternatively, the encoder (1000) is object-based or uses a different macroblock or block format.

Returning to FIG. 10, the encoder system (1000) compresses predicted pictures and intra-coded, key pictures. For the sake of presentation, FIG. 10 shows a path for key pictures through the encoder system (1000) and a path for predicted pictures. Many of the components of the encoder system (1000) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture (1005) is a predicted picture, a motion estimator (1010) estimates motion of macroblocks or other sets of samples of the current picture (1005) with respect to one or more reference pictures, for example, the reconstructed previous picture (1025) buffered in the picture store (1020). If the current picture (1005) is a bi-predictive picture, a motion estimator (1010) estimates motion in the current picture (1005) with respect to up to four reconstructed reference pictures (for an interlaced B-field, for example). Typically, a motion estimator estimates motion in a B-picture with respect to one or more temporally previous reference pictures and one or more temporally future reference pictures, but B-pictures need not be predicted from different temporal directions. The encoder system (1000) can use the separate stores (1020, 1022) for multiple reference pictures.

The motion estimator (1010) can estimate motion by full-sample, ½-sample, ¼-sample, or other increments, and can switch the precision of the motion estimation on a picture-by-picture basis or other basis. The motion estimator (1010) (and compensator (1030)) also can switch between types of reference picture sample interpolation (e.g., between bicubic and bilinear) on a per-frame or other basis. The precision of the motion estimation can be the same or different horizontally and vertically. The motion estimator (1010) outputs as side information motion information (1015) such as differential motion vector information. The encoder (1000) encodes the motion information (1015) by, for example, computing one or more predictors for motion vectors, computing differentials between the motion vectors and predictors, and entropy coding the differentials. To reconstruct a motion vector, a motion compensator (1030) combines a predictor with differential motion vector information.

The motion compensator (1030) applies the reconstructed motion vector to the reconstructed picture(s) (1025) to form a motion-compensated current picture (1035). The prediction is rarely perfect, however, and the difference between the motion-compensated current picture (1035) and the original current picture (1005) is the prediction residual (1045). During later reconstruction of the picture, the prediction residual (1045) is added to the motion compensated current picture (1035) to obtain a reconstructed picture that is closer to the original current picture (1005). In lossy compression, however, some information is still lost from the original current picture (1005). Alternatively, a motion estimator and motion compensator apply another type of motion estimation/compensation.

A frequency transformer (1060) converts the spatial domain video information into frequency domain (i.e., spectral) data. For block-based video pictures, the frequency transformer (1060) applies a DCT, variant of DCT, or other block transform to blocks of the sample data or prediction residual data, producing blocks of frequency transform coefficients. Alternatively, the frequency transformer (1060) applies another conventional frequency transform such as a Fourier transform or uses wavelet or sub-band analysis. The frequency transformer (1060) may apply an 8×8, 8×4, 4×8, 4×4 or other size frequency transform.

A quantizer (1070) then quantizes the blocks of spectral data coefficients. The quantizer applies uniform, scalar quantization to the spectral data with a step-size that varies on a picture-by-picture basis or other basis (e.g., a macroblock-by-macroblock basis). Alternatively, the quantizer applies another type of quantization to the spectral data coefficients, for example, a non-uniform, vector, or non-adaptive quantization, or directly quantizes spatial domain data in an encoder system that does not use frequency transformations. Techniques and tools relating to quantization in some implementations are described in detail below.

In addition to adaptive quantization, the encoder (1000) can use frame dropping, adaptive filtering, or other techniques for rate control.

When a reconstructed current picture is needed for subsequent motion estimation/compensation, an inverse quantizer (1076) performs inverse quantization on the quantized spectral data coefficients. An inverse frequency transformer (1066) then performs the inverse of the operations of the frequency transformer (1060), producing a reconstructed prediction residual (for a predicted picture) or a reconstructed key picture. If the current picture (1005) was a key picture, the reconstructed key picture is taken as the reconstructed current picture (not shown). If the current picture (1005) was a predicted picture, the reconstructed prediction residual is added to the motion-compensated current picture (1035) to form the reconstructed current picture. One or both of the picture stores (1020, 1022) buffers the reconstructed current picture for use in motion compensated prediction. In some embodiments, the encoder applies a de-blocking filter to the reconstructed frame to adaptively smooth discontinuities and other artifacts in the picture.

The entropy coder (1080) compresses the output of the quantizer (1070) as well as certain side information (e.g., motion information (1015), quantization step size (QP)). Typical entropy coding techniques include arithmetic coding, differential coding, Huffman coding, run length coding, LZ coding, dictionary coding, and combinations of the above. The entropy coder (1080) typically uses different coding techniques for different kinds of information (e.g., DC coefficients, AC coefficients, different kinds of side information), and can choose from among multiple code tables within a particular coding technique. The encoder (1000) may use special signaling for a skipped macroblock, which is a macroblock that has no information of certain types (e.g., no differential motion vectors for the macroblock and no residual information).

The entropy coder (1080) provides compressed video information (1095) to the buffer (1090). A buffer level indicator may be fed back to a controller. Before or after the buffer (1090), the compressed video information (1095) can be channel coded for transmission over the network. The channel coding can apply error detection and correction data to the compressed video information (1095).

A controller (not shown) receives inputs from various modules such as the motion estimator (1010), frequency transformer (1060), quantizer (1070), inverse quantizer (1076), entropy coder (1080), and buffer (1090). The controller evaluates intermediate results during encoding, for example, estimating distortion and performing other rate-distortion analysis. The controller works with modules such as the motion estimator (1010), frequency transformer (1060), quantizer (1070), and entropy coder (1080) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The encoder (1000) may include one or more modules for using regions of interest to adjust encoder settings. For example, the encoder can allow a user to preview video after quantization or other encoding stages and draw regions of interest to indicate areas for quality adjustment. Alternatively, region-of-interest adjustments can be made after the encoder (1000) outputs encoded video.

The relationships shown between modules within the encoder (1000) indicate general flows of information in the encoder; other relationships are not shown for the sake of simplicity. In particular, FIG. 10 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder (1000). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Multiple Pass Encoding and Complexity Analysis

Multiple-pass video encoders generally perform a first encoding on video data in order to determine statistics about the video data. By using information gained during a first-pass analysis, multiple-pass encoding systems are able to perform processing and encoding that is more accurately directed toward the particular nature of the video being encoded. This tuning of the process can result in an encoded video stream that either has a lower bit rate, fewer visible artifacts, or both, at a cost of increased processing time (compared to single-pass encoding) on the encoder side.

Figure 12:
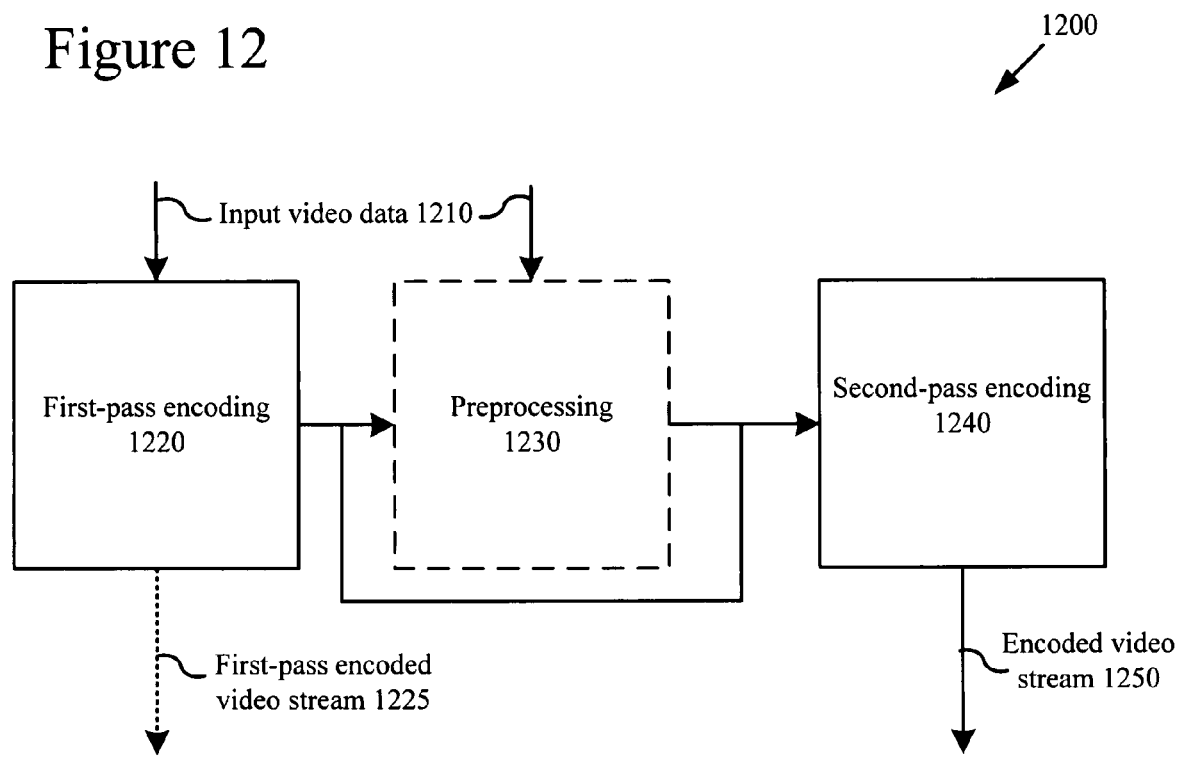
FIG. 12 is a block diagram of an example two-pass encoder system.

FIG. 12 is a block diagram illustrating one example of a two-pass video encoding system (1200). Input video data (1210) is analyzed in a first encoding pass (1220) in order to collect data about the input video and/or compress the input video into a preliminary, first-pass coded video stream (1225). The first encoding pass (1220) can use an actual video encoder (such as encoder (1000) illustrated in FIG. 10) or some other tool to perform first-pass analysis. Although the system (1200) can output a first-pass encoded video stream (1225), the first encoding pass (1220) can instead collect and provide information for a preprocessing stage (1230) and/or the second encoding pass (1240). The preprocessing stage (1230) is optional in a two-pass encoding scheme, and can include rate control decisions, selecting and applying filters (e.g., de-noising filters) to the input video data (1210), or other techniques. The second encoding pass (1240) encodes the video data into a final encoded video stream (1250) using output from the first encoding pass (1220) and/or the preprocessing stage (1230). Alternatively, more than two passes may be used before outputting the final encoded video stream (1250).

Video complexity can be measured, for example, in terms of spatial complexity and temporal complexity. Spatial complexity generally refers to the amount of busyness or detailed texture in a picture or group of pictures. Temporal complexity generally refers to the amount and nature of motion in a group of pictures. Where motion is high (such as in a fast motion scene) and/or difficult to predict (e.g., falling snow or a wind-blown water surface), temporal complexity is high.

Figure 13:
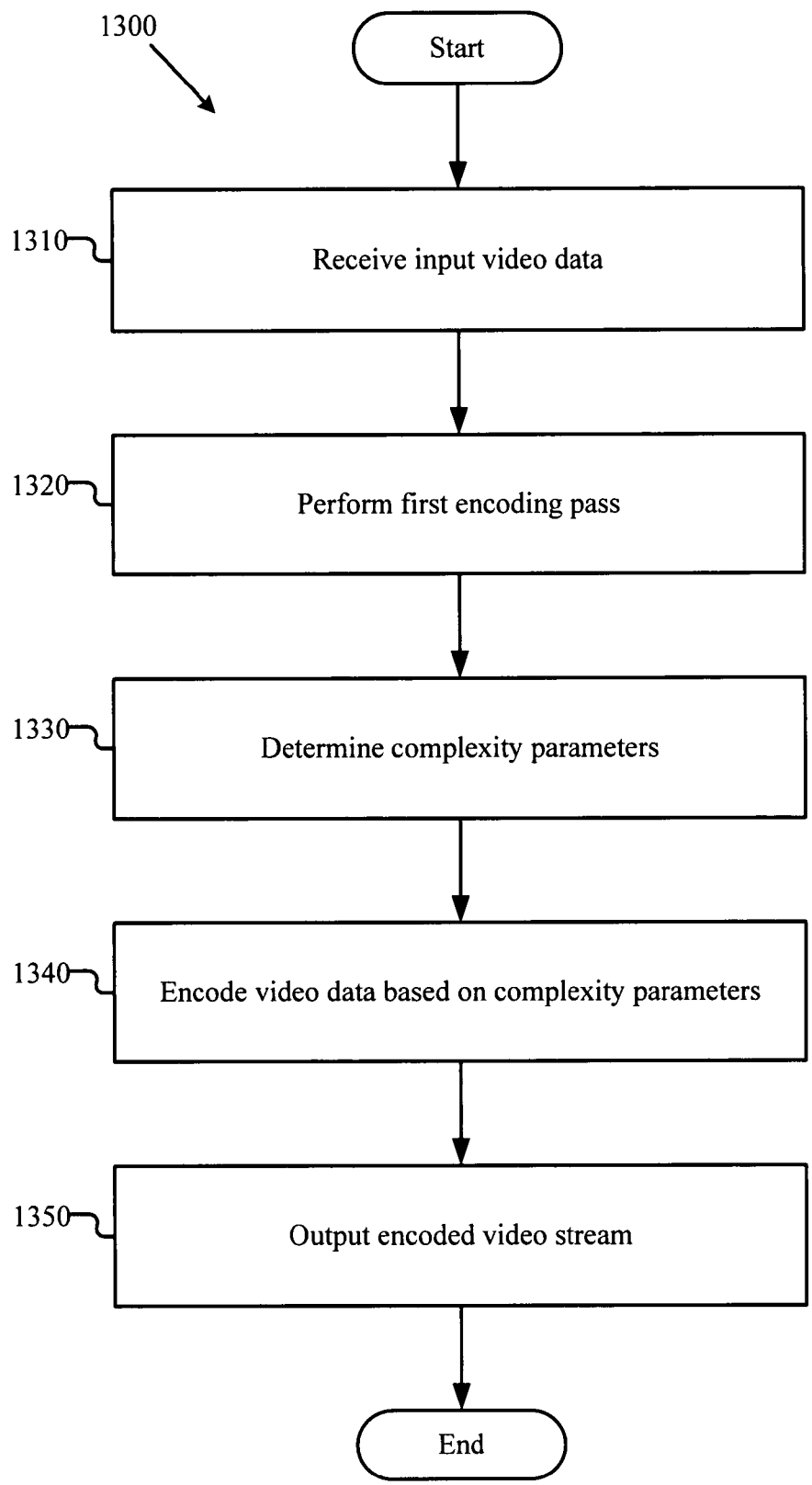
FIG. 13 is a flow chart showing an example technique for adaptively encoding video based on complexity in a two-pass encoding scheme.

FIG. 13 is a flowchart of an example technique (1300) for adaptively encoding video based on complexity of video in a two-pass encoding scheme. An encoding system such as the two-pass encoding system (1200) shown in FIG. 12 or other tool performs the technique (1300). The system (1200) receives (1310) input video data. A first encoding pass is performed (1320). During the first encoding pass (1320), information is collected that is used to measure complexity (e.g., spatial and/or temporal complexity) of the video. For example, during the first encoding pass (1320) quantization information and frame size information can be collected. Alternatively, texture information and motion information can be collected. In some implementations, the collected information is used to measure spatial and/or temporal complexity of the video in order to select a picture QP for particular picture types (e.g., B-pictures). Adaptive selection of picture QPs for predicted pictures is described in further detail below.

Referring again to FIG. 13, the system (1200) determines (1330) complexity parameters from the collected information. For example, the system (1200) performs the technique (1400) of FIG. 14 or some other technique to determine the complexity parameters. The system (1200) encodes the video data based on the complexity parameters in the second encoding pass (1340). The system (1200) can then output (1350) an encoded video stream. Alternatively, a single pass encoding system is used.

Figure 14:
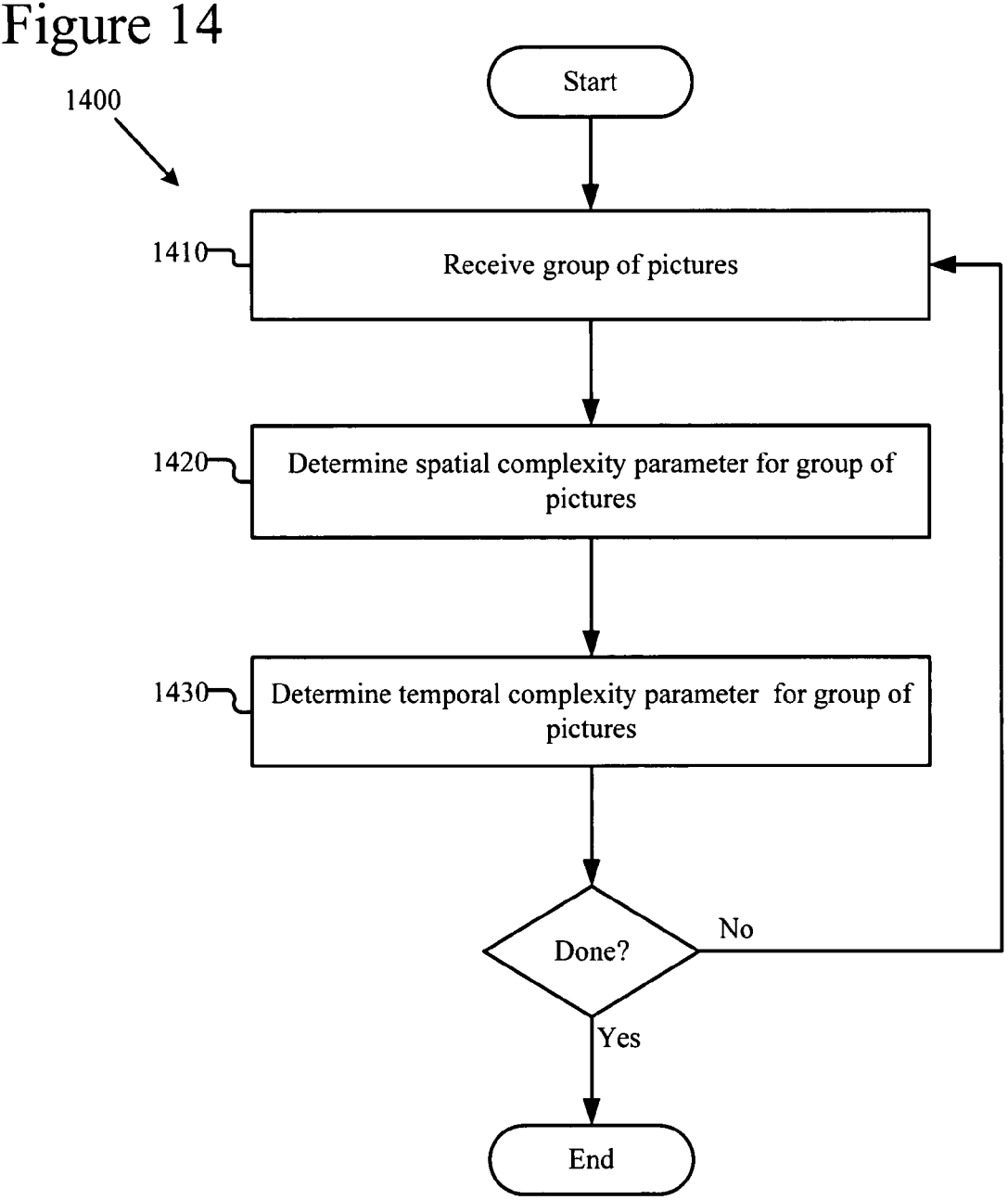
FIG. 14 is a flow chart showing an example technique for determining complexity parameters.

FIG. 14 is a flowchart of an example technique (1400) for determining complexity parameters in a two-pass encoding scheme. An encoding system such as the two-pass encoding system (1200) shown in FIG. 12 or other tool performs the technique (1400). In the example shown in FIG. 14, during the first-pass encoding process, video is processed in groups of pictures (e.g., groups with one I-picture and one or more predicted pictures). A current group of pictures is received (1410), and the system (1200) determines (1420, 1430) a spatial complexity parameter (e.g., using the technique (1500) of FIG. 15 or another technique) and a temporal complexity parameter (e.g., using the technique (1600) of FIG. 16 or another technique) for the current group of pictures. The loop can be repeated for the next group of pictures. Alternatively, complexity can be measured for individual pictures, parts of pictures, entire sequences, or on some other basis. As another alternative, a single pass encoding system is used to determine complexity parameters. Temporal and spatial complexity parameters can be used individually or combined into a unified complexity parameter.

Figure 15:
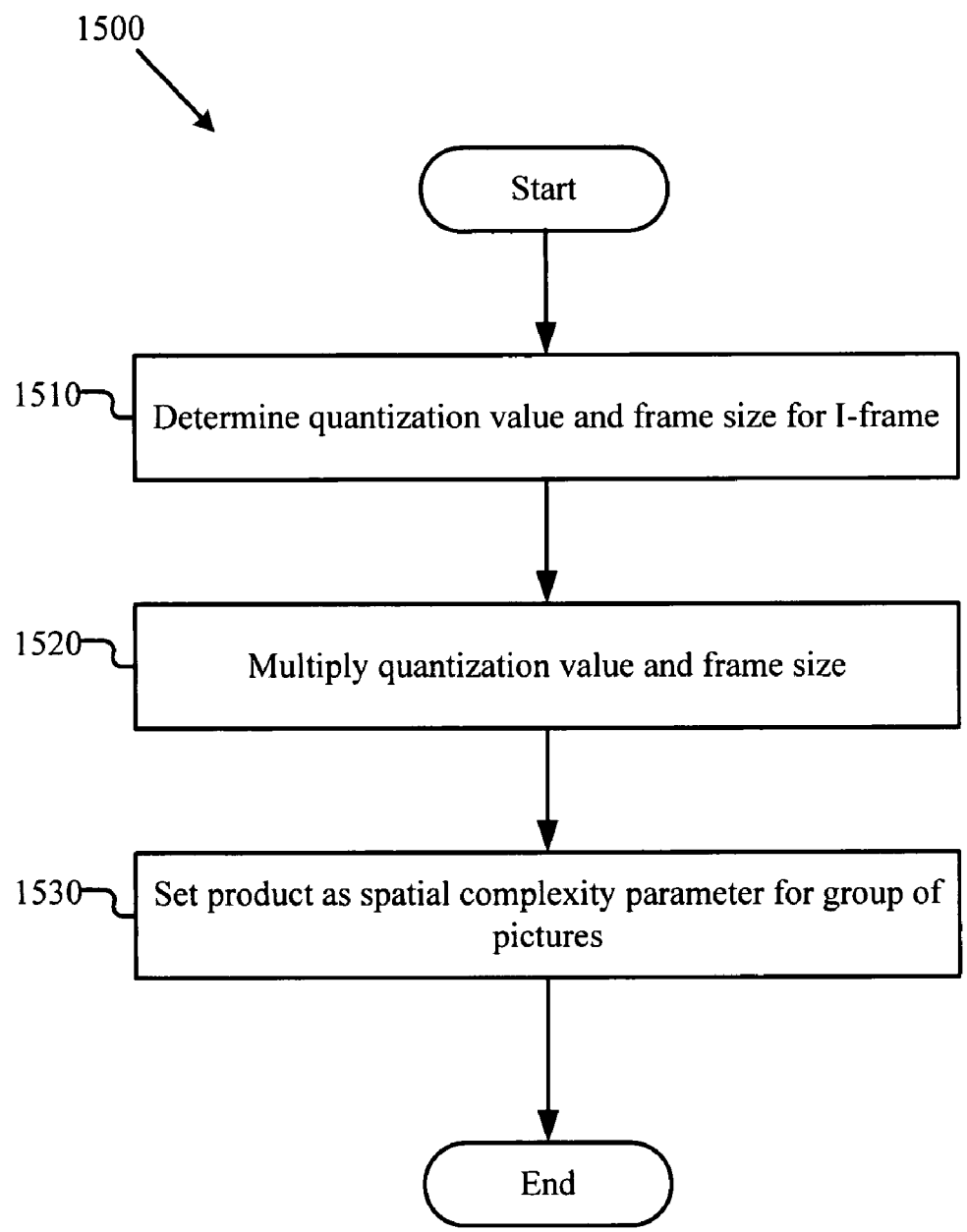
FIG. 15 is a flow chart showing an example technique for determining a spatial complexity parameter.

FIG. 15 is a flowchart of an example technique (1500) for determining a spatial complexity parameter for a group of pictures. An encoder such as the encoder (1000) shown in FIG. 10 or other tool performs the technique (1500). In a two-pass encoding scheme, an encoding system such as the two-pass encoding system (1200) shown in FIG. 12 performs the technique (1500). The example technique (1500) can be used to calculate a spatial complexity parameter by taking a quantization value (e.g., a picture QP) of an I-picture within the group of pictures and considering it along with the number bits used to encode the I-picture in order to determine spatial complexity. The number of bits used to encode a picture is sometimes referred to as its "frame size." In general, frame sizes for a given QP tend to increase as the amount of detail in a picture increases.

In the example technique (1500), a quantization value and frame size are determined (1510) for an I-picture in a group of pictures. Determining the quantization value may involve simply looking up a picture QP for the I-picture (e.g., where differential quantization is not being used). When different QPs are used within the I-picture, an average QP, median QP, minimum QP, maximum QP, or some other quantization value can be used. The quantization value and frame size for the I-picture are multiplied (1520) and this product is set (1530) as the spatial complexity parameter for the group of pictures. Thus, in this example, for a quantization value and frame size for the I-picture ($QV_1$ and $Size_1$, respectively), a spatial complexity parameter ($C_s$) used for every frame in the group of pictures is calculated as follows:

$$C_s = QV_1 \times Size_1 \qquad (4).$$

Alternatively, one or both of the quantization value and frame size may be scaled up or down or otherwise adjusted before calculating a spatial complexity parameter. Measurements of spatial complexity can consider other factors, such as texture information (e.g., information that indicates whether a given region is smooth, has sharp edges, or is highly textured) in addition to or in place of factors such as picture QP and frame size.

Figure 16:
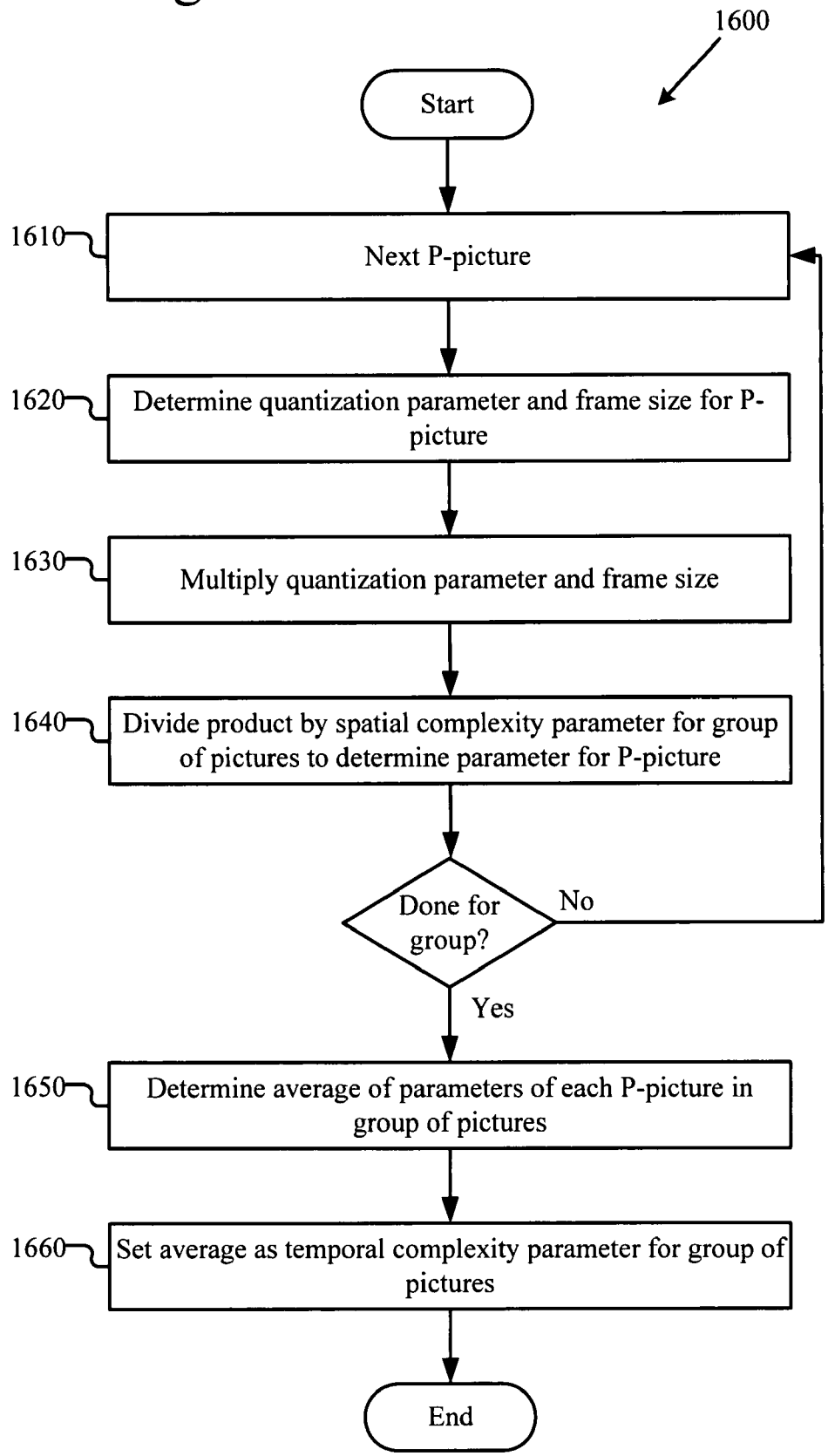
FIG. 16 is a flow chart showing an example technique for determining a temporal complexity parameter.

FIG. 16 is a flowchart of an example technique (1600) for determining a temporal complexity parameter for a group of pictures. An encoder such as the encoder (1000) shown in FIG. 10 or other tool performs the technique (1600). In a two-pass encoding scheme, an encoding system such as the two-pass encoding system (1200) shown in FIG. 12 performs the technique (1600). The example technique (1600) can be used to calculate a temporal complexity parameter by taking quantization values (e.g., picture QPs) of P-pictures within the group of pictures, whose values are related to the amount of change exhibited in the group of pictures and combining the quantization values with the P-pictures' frame sizes. In general, for a given QP, frame sizes tend to increase as the amount of change, and thus the temporal complexity, in the group of pictures increases.

In the example technique (1600), a P-picture is selected (1610) and a quantization value and frame size are determined (1620) for the P-picture being analyzed. Determining the quantization value may involve simply looking up a picture QP for the P-picture (e.g., where differential quantization is not being used). When different QPs are used within the P-picture, an average QP, median QP, minimum QP, maximum QP, or some other quantization value can be used. The quantization value and frame size for the P-picture are multiplied (1630). Thus, in this example, for a quantization value and frame size for the P-picture ($QV_P$ and $Size_P$, respectively), a first temporal complexity parameter ($C'_t$) is calculated for the P-picture as follows:

$$C'_t = QV_P \times Size_P \qquad (5).$$

While the calculation of $C'_t$ in Equation 5 does capture the general concept that lower temporal complexity should lead to a smaller frame size at a given QP, experiments show that $C'_t$ is also related to spatial complexity: given the same amount of motion and the same QP, a scene with higher spatial complexity is likely to have larger frame sizes for P-pictures compared to a scene with lower spatial complexity.

In the example shown in FIG. 16, to account for this correlation, $C'_t$ is divided (1640) by the spatial complexity parameter for the group of pictures, which can be obtained using the technique (1500) illustrated in FIG. 15. This potentially more accurate measure for the temporal complexity of the P-picture can be calculated as follows:

$$C_t = \frac{C'_t}{C_s}. \qquad (6)$$

This process can be repeated for each P-picture in a group of pictures or some subset of P-pictures in a group. It can also be repeated for some or all B-pictures in the group of pictures.

To obtain a single temporal complexity parameter for the group of pictures, an average (or median, minimum, maximum, or some other synthesis) of the temporal complexity parameters for P-pictures can be calculated (1650) and set (1660) as the temporal complexity parameter for the group of pictures.

For more information on measuring spatial and temporal complexity and on multi-pass encoding in some implementations, see U.S. patent application Ser. No. 11/673,516, filed on Feb. 9, 2007.

Estimated complexity can be used to make better encoding decisions in other encoding and preprocessing modules. For example, an encoding system can use complexity parameters to adjust quantization, such as by adjusting quantization dead zones or selecting delta QPs for P-pictures or B-pictures based at least in part on the complexity parameters, as described below.

IV. Techniques and Tools for Adaptive Quantization for Predicted Pictures

Under one possible measure of video quality, video encoders aim to achieve a desired quality level over entire video sequences, rather than focusing solely on the quality of individual pictures. To help maintain quality over sequences of pictures, it is important for encoders to make good decisions as to how many bits to use on particular pictures of different types. A poor bit allocation scheme may cause an encoder to use too many bits encoding some pictures and not enough bits encoding others.

In general, the quality of reference pictures in a sequence directly affects the quality of the entire sequence. Therefore, it is important for encoders to allocate enough bits for I-pictures and P-pictures to maintain high quality because I-pictures and P-pictures are often used as motion compensation references for other pictures. Encoding artifacts that appear in individual I-pictures and P-pictures are likely to be propagated to other pictures, but this is not the case for B-pictures that are not used as reference pictures.

When encoding video, overall coding quality can be improved if fewer bits are allocated to B-pictures than to I-pictures and P-pictures. Unlike I-pictures and P-pictures, B-pictures are generally not used as reference pictures for other pictures in motion compensation. For this reason, slightly reducing the quality of B-pictures (e.g., by increasing a quantization step size) will not affect the quality of other frames. In addition, quality gains from spending more bits encoding B-pictures (e.g., by using smaller quantization step sizes) are generally not as significant as quality gains from spending those bits encoding I-pictures and P-pictures. Therefore, quality often can be improved by saving bits in B-pictures and using the saved bits to improve the quality of I-pictures and P-pictures.

Restrictions on frequency of B-pictures can make quality loss in B-pictures even less noticeable. For example, when consecutive progressive B-frames (in display order) are not allowed in a sequence, individual progressive B-frames will be displayed between two reference frames. If the reference frames are coded with good quality and the motion between the frames can be accurately predicted, the progressive B-frame will likely be perceived as a good quality frame even if it is coded with a higher QP than the reference frames. Even if the higher QP reduces the quality of the B-frame, it is likely that the reduction in quality will not be noticeable because of the quality of motion-compensated prediction and/or because human eyes tend to average the picture quality temporally. An isolated lower-quality frame generally will not affect users' overall viewing experience when the video is played in real-time.

A. Adjusting Picture QPs for Predicted Pictures (Adaptive Delta QP)

An encoder can make various kinds of adjustments to B-pictures to maintain quality in video sequences while keeping bit rate relatively low. For example, U.S. patent application Ser. No. 11/400,744, filed Apr. 7, 2006, describes a rate control scheme for B-pictures that combines quantization step size control with adaptive dead zone control. Another way to adjust B-pictures to maintain quality in video sequences while keeping bit rate relatively low is to adjust a difference (sometimes referred to as a "delta QP") between a picture QP for a B-picture and a picture QP for an I-picture.

As mentioned above, an isolated lower-quality frame generally will not affect users' overall viewing experience over a sequence of frames. Based on this idea, techniques and tools for adaptively adjusting picture QPs for predicted pictures (e.g., B-pictures) to help achieve better bit allocation are described. For example, an encoder can implement one or more of the following features:
  1. For B-frames, adaptive selection of a delta QP based on one or more of the following:
    a. spatial complexity;
    b. temporal complexity;
    c. differential quantization status (i.e., whether differential quantization is being used).
  2. For B-fields, adaptive selection of a delta QP based on one or more of the following:
    a. spatial complexity;
    b. temporal complexity;
    c. differential quantization status;
    d. whether the B-field will be used as a reference (i.e., the field order of the B-field).

Figure 17:
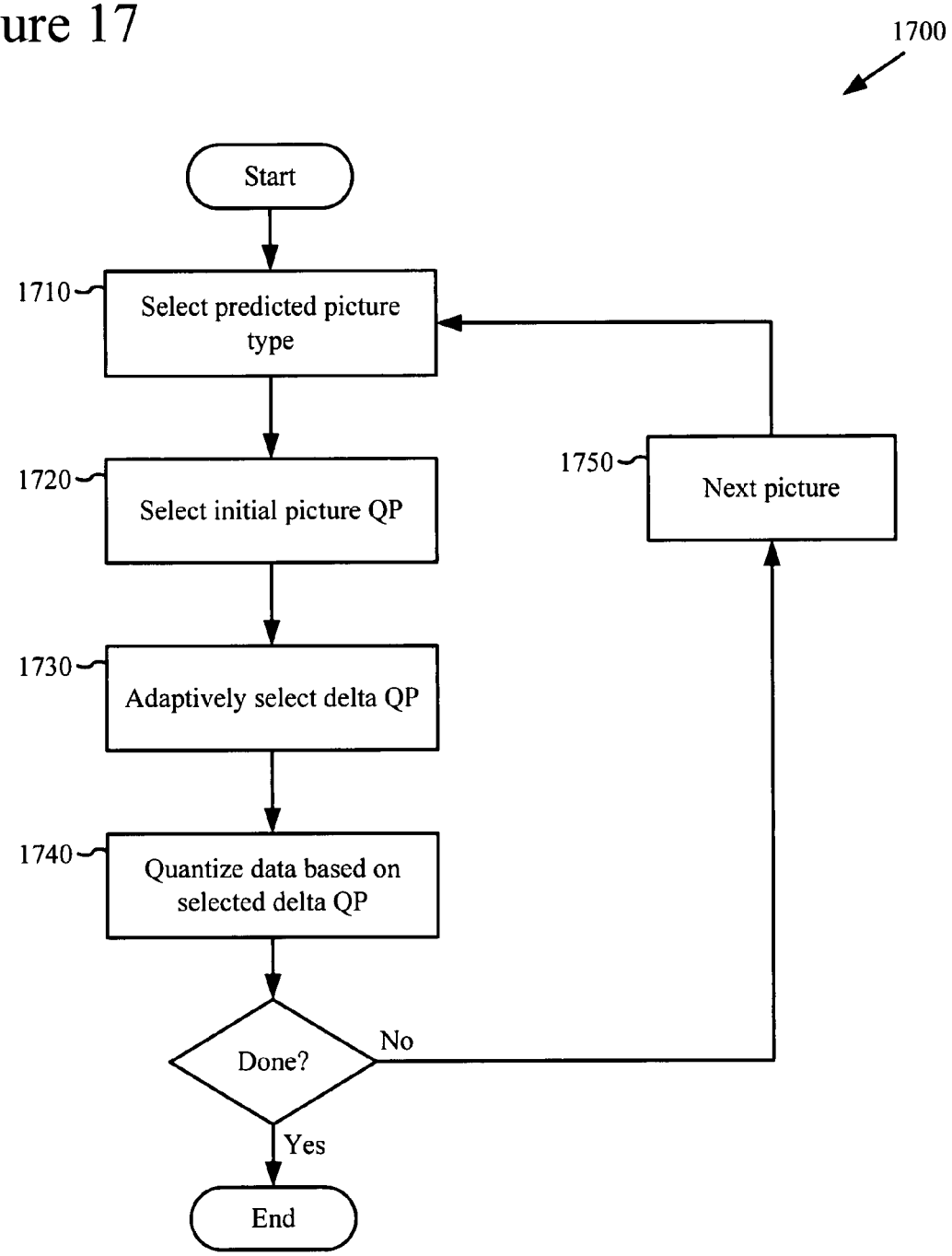
FIG. 17 is a flow chart showing an example technique for adaptively selecting a delta QP in order to adjust a picture QP for a predicted picture.

FIG. 17 is a flow chart showing an example technique (1700) for adaptively adjusting a picture QP for a predicted picture. An encoder such as the encoder (1000) shown in FIG. 10 or other tool performs the technique (1000). In a two-pass encoding scheme, an encoding system such as the system (1200) shown in FIG. 12 performs the technique (1700).

Referring again to FIG. 17, the encoder selects (1710) a picture type for a current predicted picture. The encoder can use various criteria for selecting picture types, although the encoder may have to follow certain rules for selecting picture types in order to be compliant with a decoder. In this example, the encoder encodes predicted pictures as P-pictures or B-pictures.

The encoder selects (1720) an initial QP for the current picture based at least in part upon the selected picture type. Typically, initial picture QPs for predicted pictures such as B-pictures will be higher than initial QPs for I-pictures. Then, the encoder adaptively selects (1730) a delta QP for the current predicted picture. For example, the encoder adaptively selects a delta QP for a B-picture based on spatial complexity, temporal complexity, differential quantization status, and/or other factors. The encoder also can adjust quantization for the current picture in other ways, such as by selecting a larger or smaller dead zone, or switching between a uniform quantizer and non-uniform quantizer.

The encoder quantizes (1740) data for the current picture based on the selected delta QP. For example, the encoder uses an adjusted QP determined by adjusting the initial QP for the picture by the delta QP for the picture. The encoder can then process (1750) other pictures.

1. Example Delta Qp Factors

For example, assume $QP_{BRC}$ is the QP selected by an encoder's rate controller module for a B-picture. An adjusted picture QP for a B-picture ($QP_B$) can be calculated by adding a delta QP ($\Delta QP$) to $QP_{BRC}$:

$$QP_B = QP_{BRC} + \Delta QP \qquad (7).$$

$\Delta QP$ can be determined adaptively based on several factors. Generally, one possible factor to be considered when determining $\Delta QP$ is scene complexity. When scene complexity is low, a bigger QP generally can be used for B-pictures in the scene without causing noticeable artifacts.

As mentioned above, a delta QP can be selected based on many different factors, including spatial complexity, temporal complexity, differential quantization (i.e., whether quantization step sizes vary between macroblocks in the picture), and whether the picture will be used as reference. In some cases, it may be desirable to take all of these factors into consideration. In other cases, some subset of these factors and/or other factors can be considered.

Spatial Complexity

Spatial complexity can be measured by performing pre-encoding analysis of a picture or group of pictures. For example, spatial complexity can be measured based on a texture analysis of a picture or group of pictures. Texture analysis can include determining whether high-textured, smooth, or sharp-edge features are present. In the case of two-pass encoding, spatial complexity may be calculated from first-pass encoding results using various techniques such as the technique (1500) shown in FIG. 15. Spatial complexity is typically considered to be high in high-texture pictures, for which the delta QP will usually be lower than for low-texture pictures. Spatial complexity is typically considered to be low in low-texture pictures, for which the delta QP will usually be higher than for high-texture pictures.

Temporal Complexity

Temporal complexity also can be measured by performing pre-encoding analysis of a picture or group of pictures. For example, temporal complexity can be measured based on a fast motion search on down-sampled frames. In the case of two-pass encoding, temporal complexity may be calculated from first-pass encoding results using various techniques such as the technique (1600) shown in FIG. 16. Temporal complexity is typically considered to be high in high-motion pictures (or other pictures where change over time is significant), for which the delta QP will usually be lower than for low temporal complexity pictures.

Differential Quantization

Differential quantization is a within-frame macroblock quantization scheme in which the encoder chooses different QPs for different macroblocks in the same picture, which can help to reduce visible artifacts. For example, a lower QP may be chosen for macroblocks in smooth regions where quantization artifacts are more likely to be perceived. In this case, an encoder can increase a delta QP for the picture since differential quantization will still tend to result in a lower QP in regions that are likely to cause visible artifacts.

Reference Picture Status

Reference picture status for a current picture (i.e., whether or not the current picture can be used as a reference picture) is usually determined based on picture type. In one implementation, progressive B-frames and interlaced B-frames are not used as reference pictures, while B-fields can be used as reference pictures: specifically, the first B-field to be decoded in a frame having two B-fields is available for use as a reference for the second field to be decoded in the frame. Typically, a delta QP for a picture of a type that will not be used as a reference picture will be higher than a delta QP for a picture of a type that will potentially be used as a reference picture.

2. Example B-field Delta Qp Decision

In the following example, an encoder makes a delta QP decision for a B-field by looking at temporal complexity, differential quantization status, and whether the current B-field will be used as a reference picture for the other field in the frame. In this example, spatial complexity is not separately considered, although spatial characteristics may affect temporal complexity for some temporal complexity measures. Specifically, in this example, AQP is calculated as follows:

$$\Delta QP = d_1 + d_{dquant} + d_{ref} \quad (8).$$

The value represented by $d_1$ is derived from a measure of temporal complexity, as shown in Equation 9, below. For a temporal complexity measure $C_T$, suppose $0 \le C_T$. $C_T$ indicates how difficult it is to predict the current picture from its reference pictures (a bigger number means higher difficulty).

$$d_1 = \begin{cases} 4, & \text{if } 0 \le C_T < 0.25 \\ 3, & \text{if } 0.25 \le C_T < 0.375 \\ 2, & \text{if } 0.375 \le C_T < 0.75 \\ 1, & \text{if } 0.75 \le C_T. \end{cases} \quad (9)$$

In practice, pictures that are difficult to predict will often have larger residuals for predicted blocks and/or larger numbers of intra blocks that are not predicted. For the thresholds shown in Equation (9), $C_T$ is computed as shown in Equation (6). For other measures of $C_T$ (e.g., in a single-pass encoder, $C_T$ can be derived from a low-complexity, fast motion search on down-sampled versions of the frames), the thresholds for delta QP adjustments vary depending on implementation.

The value represented by $d_{dquant}$ is derived from whether differential quantization is on, as shown in Equation 10, below.

$$d_{dquant} = \begin{cases} 1 & \text{if } dquant \text{ is on} \\ 0 & \text{if } dquant \text{ is off.} \end{cases} \quad (10)$$

For example, in one implementation that uses differential quantization, an encoder makes decisions on how to vary the QPs, and signals those decisions, as appropriate, to a decoder. The encoder sends a bitstream element (DQUANT) at a syntax level called "entry point" level that corresponds to a group of pictures to indicate differential quantization status for the group of pictures. If DQUANT=0, the picture QP is used for all macroblocks in the picture. If DQUANT=1 or 2, different macroblocks in the same picture can use different QPs. Depending on the value of DQUANT, different forms of differential quantization can be signaled to a decoder. In one approach, only two different QPs are used for a picture. This is referred to as bi-level differential quantization. For example, one QP is used for macroblocks at picture edges and another QP is used for macroblocks in the rest of the picture. In another approach, referred to as multi-level differential quantization, a larger number of different QPs can be used for individual macroblocks in a picture.

The value of $d_{dquant}$ could take on more than two different values. For example, if multi-level differential quantization is used, $d_{dquant}$ could take on a different value than where bi-level differential quantization is used, and $d_{dquant}$ could take on a third value when differential quantization is not used at all.

The value represented by $d_{ref}$ depends on whether the current B-field will be used as a reference for the other B field in the same frame, as shown in Equation 11, below.

$$d_{ref} = \begin{cases} 1, & \text{if the current } B \text{ field will not be used as reference} \\ 0, & \text{otherwise.} \end{cases} \quad (11)$$

The value of $d_{ref}$ could be determined in different ways. For example, the value of $d_{ref}$ could take on one value if the B-field is actually used as a motion compensation reference, and take on another value if the B-field is not actually used, or not available to be used, as a motion compensation reference.

2. Example B-frame Delta Qp Decision

In the following example, an encoder makes a delta QP decision for a B-frame by looking at temporal complexity and differential quantization status. The encoder does not consider whether the current B-frame will be used as a reference picture since B-frames are never used as motion compensation references. Again, spatial complexity is not separately considered, although spatial characteristics may affect temporal complexity for some temporal complexity measures. Specifically, in this example, AQP is calculated as follows:

$$\Delta QP = d_1 + d_{dquant} \quad (12).$$

B. Alternatives

As noted above, alternatively, an encoder makes a delta QP decision for B-pictures by looking at other combinations of factors. For example, an encoder can consider spatial complexity (or other factors) or omit consideration of factors such as temporal complexity, differential quantization status, and whether the current B-field will be used as a reference picture for the other field in the frame. As another alternative, an encoder can adaptively select delta QPs for other predicted pictures (e.g., P-pictures).

Having described and illustrated the principles of our invention with reference to various described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a video encoder, a method comprising:
selecting a picture type for a current picture comprising video data, the current picture having an initial picture quantization parameter;
obtaining a measure of temporal complexity for the current picture;
selecting a delta quantization parameter for the current picture based at least in part on the picture type for the current picture and the measure of temporal complexity for the current picture, wherein the delta quantization parameter is a difference between a picture quantization parameter for a B-picture and a picture quantization parameter for an I-picture, and selecting includes selecting the delta quantization parameter so that fewer bits are allocated for B-pictures than for I-pictures;
determining an adjusted picture quantization parameter for the current picture based at least in part on the selected delta quantization parameter; and
quantizing the video data of the current picture based at least in part on the adjusted picture quantization parameter for the current picture.

2. The method of claim 1 wherein the selected picture type for the current picture is a B-picture type.

3. The method of claim 1 wherein the determining the adjusted picture quantization parameter for the current picture comprises adding the selected delta quantization parameter to the initial picture quantization parameter.

4. The method of claim 1 further comprising outputting encoded data for the current picture.

5. The method of claim 1 wherein the quantizing the video data comprises differentially quantizing the video data.

6. The method of claim 1 wherein the selecting the delta quantization parameter for the current picture is also based at least in part on one or more of a measure of spatial complexity for the current picture and a differential quantization factor.

7. In a video encoder, a method comprising:
for a current B-picture comprising video data:
obtaining a measure of temporal complexity for a group of pictures comprising the current B-picture;
selecting a delta quantization parameter for the current B-picture based at least in part on the measure of temporal complexity and whether differential quantization is active;
determining a picture quantization parameter for the current B-picture based at least in part on the selected delta quantization parameter, the delta quantization parameter being associated with a difference between a picture quantization parameter for the B-picture and a picture quantization parameter for an I-picture; and
quantizing the video data of the current picture based at least in part on the picture quantization parameter for the current B-picture.

8. The method of claim 7 wherein the current B-picture is a B-field.

9. The method of claim 8 wherein the selecting the delta quantization parameter is further based on whether the B-field is available for use as a reference field.

10. The method of claim 7 wherein the current B-picture is a progressive B-frame or an interlaced B-frame.

11. The method of claim 7 wherein the selecting the delta quantization parameter comprises:
selecting a larger delta quantization parameter if differential quantization is active, otherwise selecting a smaller delta quantization parameter.

12. The method of claim 7 further comprising, for the current B-picture:
obtaining a measure of spatial complexity for the current B-picture;
wherein the selecting the delta quantization parameter for the current B-picture is further based on the measure of spatial complexity.

13. The method of claim 7 wherein the determining the picture quantization parameter for the current B-picture comprises adding the selected delta quantization parameter to an initial picture quantization parameter for the current B-picture.

14. The method of claim 7 further comprising outputting encoded data for the current B-picture.

15. The method of claim 7 wherein the quantizing the video data comprises differentially quantizing the video data.

16. The method of claim 7 wherein the current B-picture is a B-field, the method further comprising, for the B-field:
obtaining a measure of spatial complexity for the B-field; and
determining whether the B-field is used as a reference field;
wherein the selecting the delta quantization parameter is further based on the measure of spatial complexity and whether the B-field is used as a reference field.

17. The method of claim 7 wherein the method is performed as part of single-pass encoding.

18. The method of claim 7 wherein the method is performed as part of multi-pass encoding.

19. One or more computer-readable nonvolatile storage devices having stored thereon computer executable instructions to cause one or more computers to perform the method of claim 7.

20. An encoder comprising:
a frequency transformer for frequency transforming plural blocks of spatial domain information into plural blocks of transform coefficients;
a quantizer for quantizing the transform coefficients;
an entropy encoder for entropy encoding the quantized transform coefficients;
an inverse quantizer for inverse quantizing the quantized transform coefficients; and
a controller for selecting quantization parameters for the quantizing, wherein the controller implements:
a first path for selecting picture quantization parameters for B-pictures based at least in part on a delta quantization parameter derived from one or more measures of temporal complexity corresponding to the B-pictures, the delta quantization parameter being a difference between a picture quantization parameter for a B-picture and an I-picture and wherein the delta quantization parameter is chosen such that fewer bits are allocated for B-pictures than for I-pictures; and
a second path for selecting picture quantization parameters for pictures of types other than B-pictures.

* * * * *